(12) United States Patent
Sakamoto et al.

(10) Patent No.: US 9,153,820 B2
(45) Date of Patent: Oct. 6, 2015

(54) BINDER COMPOSITION FOR NON-AQUEOUS BATTERY ELECTRODE, ELECTROLYTE SOLUTION COMPOSITION FOR NON-AQUEOUS BATTERY, AND USE THEREOF

(75) Inventors: Kei Sakamoto, Tokyo (JP); Natsuko Nakata, Tokyo (JP); Yasuhiro Wakizaka, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 168 days.

(21) Appl. No.: 13/806,986

(22) PCT Filed: Jun. 28, 2011

(86) PCT No.: PCT/JP2011/064822
§ 371 (c)(1),
(2), (4) Date: Dec. 26, 2012

(87) PCT Pub. No.: WO2012/002396
PCT Pub. Date: Jan. 5, 2012

(65) Prior Publication Data
US 2013/0230768 A1 Sep. 5, 2013

(30) Foreign Application Priority Data

Jun. 30, 2010 (JP) ................................. 2010-149389
Jul. 15, 2010 (JP) ................................. 2010-160785
Sep. 29, 2010 (JP) ................................. 2010-219423

(51) Int. Cl.
*H01M 4/62* (2006.01)
*H01M 10/052* (2010.01)
*H01M 10/0567* (2010.01)
*H01M 10/0564* (2010.01)

(52) U.S. Cl.
CPC .............. *H01M 4/622* (2013.01); *H01M 4/621* (2013.01); *H01M 10/052* (2013.01); *H01M 10/0564* (2013.01); *H01M 10/0567* (2013.01); *Y02E 60/122* (2013.01); *Y02T 10/7011* (2013.01)

(58) Field of Classification Search
CPC ............................. H01M 4/621; H01M 4/622
See application file for complete search history.

(56) References Cited

U.S. PATENT DOCUMENTS 5,631,100 A * 5/1997 Yoshino et al. ................. 429/62
6,818,347 B1 * 11/2004 Jin et al. ......................... 429/206
2007/0048605 A1 * 3/2007 Pez et al. ....................... 429/199
2007/0087267 A1 * 4/2007 Kim et al. ...................... 429/217
2008/0213669 A1 * 9/2008 Nakahara et al. .......... 429/231.95
2009/0162750 A1 * 6/2009 Kawakami et al. ......... 429/218.1
2009/0197161 A1 * 8/2009 Nakamura ..................... 429/158
2010/0055547 A1 * 3/2010 Nakamura ....................... 429/71
2010/0075218 A1 * 3/2010 Tatematsu et al. ............. 429/157
2010/0266901 A1 * 10/2010 Johnson ..................... 429/231.8
2012/0135278 A1 * 5/2012 Yoshie et al. ...................... 429/7
2013/0130102 A1 * 5/2013 Sakamoto et al. ............. 429/200
2014/0308572 A1 * 10/2014 Tsuchida et al. .............. 429/162

FOREIGN PATENT DOCUMENTS

| CN | 101278423 A | 10/2008 |
| EP | 1385182 A1 * | 1/2004 |
| JP | 8-64240 A | 3/1996 |
| JP | 8-130036 A | 5/1996 |
| JP | 10-116631 A | 5/1998 |
| JP | 11-111333 A | 4/1999 |
| JP | 2000-113906 A | 4/2000 |
| JP | 2000-264884 A | 9/2000 |
| JP | 2002-316994 A | 10/2002 |
| JP | 2006-12780 A | 1/2006 |
| JP | 2008-147014 A | 6/2008 |

OTHER PUBLICATIONS

International Search Report for PCT/JP2011/064822 mailed on Sep. 27, 2011.
Written Opinion of the International Searching Authority for PCT/JP2011/064822 mailed on Sep. 27, 2011.

* cited by examiner

*Primary Examiner* — Ula C Ruddock
*Assistant Examiner* — Scott J Chmielecki
(74) *Attorney, Agent, or Firm* — Birch, Stewart, Kolasch & Birch, LLP

(57) ABSTRACT

A binder composition for a non-aqueous battery electrode containing a binder and an ether compound represented by the formula (1), and an electrolyte solution composition for a non-aqueous battery containing an ether compound represented by the formula (1), wherein m and n each independently represent 0 or 1, and $R^1$ represents a divalent linear hydrocarbon group which may have in the bond thereof one or more intervening groups selected from the group consisting of an oxygen atom, a sulfur atom, and a carbonyl group.

12 Claims, No Drawings

BINDER COMPOSITION FOR NON-AQUEOUS BATTERY ELECTRODE, ELECTROLYTE SOLUTION COMPOSITION FOR NON-AQUEOUS BATTERY, AND USE THEREOF

FIELD

The present invention relates to a binder composition for a non-aqueous battery electrode, and a slurry composition for a non-aqueous battery electrode, an electrode for a non-aqueous battery, a slurry composition for a positive electrode of a non-aqueous battery, a positive electrode for a non-aqueous battery, and a non-aqueous battery, each of which uses the binder composition. The present invention also relates to an electrolyte solution composition for a non-aqueous battery and a non-aqueous battery using the same.

BACKGROUND ART

Non-aqueous batteries such as lithium secondary batteries are being turned into practical use in a variety of applications ranging from consumer power sources for, e.g., cell phones and notebook computers to drive power sources equipped on vehicles such as automobiles. Important properties required for non-aqueous batteries such as lithium secondary batteries may include high discharge capacity and stable charge-discharge cycle. The stable charge-discharge cycle herein means that the discharge capacity of the non-aqueous battery does not easily decrease even after repeated charging and discharging. Further, such an excellent stability of charge-discharge cycle may be also referred to as excellent cycle property.

It has been conventionally known that the composition of the non-aqueous electrolyte solution has a significant influence on the stability of the charge-discharge cycle of the non-aqueous batteries such as lithium secondary batteries. Therefore, there has been proposed a technology for improving performance of a non-aqueous battery by developing the composition of the non-aqueous electrolyte solution. For example, Patent Literature 1 proposes an electrolyte solution in which lithium trifluoromethanesulfonate is dissolved as an electrolyte in a mixed solvent containing specific amounts of a cyclic carbonate ester, a chain carbonate ester, and an ether. Further, Patent Literature 2 proposes a non-aqueous battery in which a metal composite oxide having a high discharge capacity is used as a negative electrode and a mixed solvent of, e.g., ethylene carbonate and a chain carbonate ester is used as a non-aqueous electrolyte. Patent Literatures 3 and 4 describe technologies of adding a simple cyclic ether compound such as 1,3-dioxolane, tetrahydrofuran, tetrahydropyran, and dioxane to a non-aqueous electrolyte solution.

CITATION LIST

Patent Literature

Patent Literature 1: Japanese Patent Application Laid-Open No. Hei. 8-64240 A
Patent Literature 2: Japanese Patent Application Laid-Open No. Hei. 8-130036 A
Patent Literature 3: Japanese Patent Application Laid-Open No. Hei. 10-116631 A
Patent Literature 4: Japanese Patent Application Laid-Open No. 2006-012780 A

SUMMARY

Technical Problem

However, in the technologies described in Patent Literatures 1 and 2, although the stability of the charge-discharge cycle was improved, the discharge capacity that an electrode material intrinsically has was decreased and it was thus unable to obtain a sufficient discharge capacity.

Further, Patent Literature 4 describes that the technologies of adding a simple cyclic ether compound described in Patent Literatures 3 and 4 do not improve continuous charge property (particularly, a remaining capacity after continuous charge) and high-temperature storage property. In particular, the problem in a high temperature environment has been left unresolved.

Therefore, an object of the present invention is to provide a non-aqueous battery having a high initial discharge capacity in a high temperature environment.

Another object of the present invention is to provide a non-aqueous battery which has a high capacity and an excellent stability of a charge-discharge cycle at high temperatures by balancing a high discharge capacity and a stable charge-discharge cycle in a high temperature environment.

Solution to Problem

The present inventors have intensively studied to achieve the aforementioned objects, and as a result, found out the following surprising findings.

When a binder composition for producing an electrode active material layer contains a cyclic ether compound having a specific substituent, the initial discharge capacity in a high temperature environment can be improved, and usually a stable charge-discharge cycle at higher temperatures can also be achieved. Therefore, this can provide a significant effect of solving the problems.

When an electrolyte solution composition for a non-aqueous battery contains a cyclic ether compound having a specific substituent, a high discharge capacity and a stable charge-discharge cycle at high temperatures can be balanced at high levels. This can provide a significant effect of solving the problems.

The present invention has been completed on the basis of the aforementioned findings.

That is, according to the present invention, the following [1] to [16] are provided.

(1) A binder composition for a non-aqueous battery electrode, comprising a binder and an ether compound represented by the formula (1):

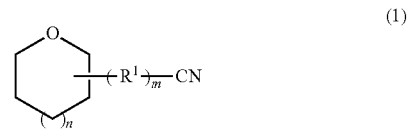

wherein
m and n each independently represent 0 or 1, and
$R^1$ represents a divalent linear hydrocarbon group which may have in the bond thereof one or more intervening groups selected from the group consisting of an oxygen atom, a sulfur atom, and a carbonyl group.

(2) The binder composition for a non-aqueous battery electrode according to (1), wherein $R^1$ in the formula (1) represents a divalent linear hydrocarbon group which may have in the bond thereof one or more intervening groups selected from the group consisting of —O—, —S—, —C(=O)—O—, and —O—C(=O)—.

(3) The binder composition for a non-aqueous battery electrode according to (1) or (2), wherein $R^1$ in the formula (1) is represented by the formula (2):

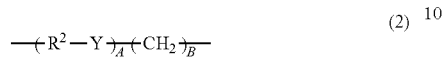

(2)

wherein
A represents 0 or 1,
Y represents any one selected from the group consisting of —O—, —S—, —C(=O)—O—, and —O—C(=O)—,
$R^2$ represents a divalent linear hydrocarbon group of 1 to 16 carbon atoms which may have in the bond thereof one or more intervening groups selected from the same group as those for the Y, and
B represents an integer of 0 to 11.

(4) The binder composition for a non-aqueous battery electrode according to any one of (1) to (3), wherein the ether compound is represented by the formula (3):

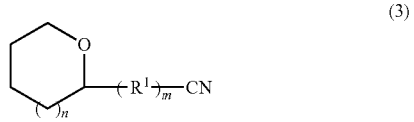

(3)

wherein
m and n each independently represent 0 or 1, and
$R^1$ represents a divalent linear hydrocarbon group which may have in the bond thereof one or more intervening groups selected from the group consisting of an oxygen atom, a sulfur atom, and a carbonyl group.

(5) The binder composition for a non-aqueous battery electrode according to any one of (1) to (4), wherein the binder contains an acrylic-based polymer.

(6) A slurry composition for a non-aqueous battery electrode, comprising an electrode active material and the binder composition for a non-aqueous battery electrode according to any one of (1) to (5).

(7) An electrode for a non-aqueous battery, comprising a current collector and an electrode active material layer provided on a surface of the current collector, wherein
the electrode active material layer is obtained by applying and drying the slurry composition for a non-aqueous battery electrode according to (6).

(8) A slurry composition for a positive electrode of a non-aqueous battery, comprising a positive electrode active material and the binder composition for a non-aqueous battery electrode according to (5).

(9) A positive electrode for a non-aqueous battery, comprising a current collector and a positive electrode active material layer provided on a surface of the current collector, wherein
the positive electrode active material layer is obtained by applying and drying the slurry composition for a positive electrode of a non-aqueous battery according to (8).

(10) A non-aqueous battery comprising a positive electrode, a negative electrode, and a non-aqueous electrolyte solution, wherein
at least one of the positive electrode and the negative electrode is the electrode for a non-aqueous battery according to (7).

(11) An electrolyte solution composition for a non-aqueous battery, comprising an organic solvent, an electrolyte dissolved in the organic solvent, and an ether compound represented by the formula (1):

(1)

wherein
m and n each independently represent 0 or 1, and
$R^1$ represents a divalent linear hydrocarbon group which may have in the bond thereof one or more intervening groups selected from the group consisting of an oxygen atom, a sulfur atom, and a carbonyl group.

(12) The electrolyte solution composition for a non-aqueous battery according to (11), wherein $R^1$ in the formula (1) represents a divalent linear hydrocarbon group which may have in the bond thereof one or more intervening groups selected from the group consisting of —O—, —S—, —C(=O)—O—, and —O—C(=O)—.

(13) The electrolyte solution composition for a non-aqueous battery according to (11) or (12), wherein $R^1$ in the formula (1) is represented by the formula (2):

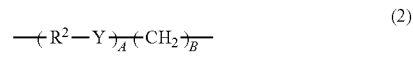

(2)

wherein
A represents 0 or 1,
Y represents any one selected from the group consisting of —O—, —S—, —C(=O)—O—, and —O—C(=O)—,
$R^2$ represents a divalent linear hydrocarbon group of 1 to 16 carbon atoms which may have in the bond thereof one or more intervening groups selected from the same group as those for the Y, and
B represents an integer of 0 to 11.

(14) The electrolyte solution composition for a non-aqueous battery according to any one of (11) to (13), wherein the ether compound is represented by the formula (3):

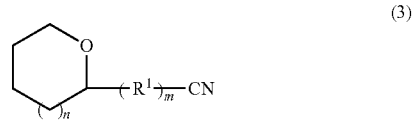

(3)

wherein
m and n each independently represent 0 or 1, and
$R^1$ represents a divalent linear hydrocarbon group which may have in the bond thereof one or more intervening groups selected from the group consisting of an oxygen atom, a sulfur atom, and a carbonyl group.

(15) A non-aqueous battery comprising the electrolyte solution composition for a non-aqueous battery of any one of (11) to (14).

(16) The non-aqueous battery according to (15), further comprising a positive electrode and a negative electrode, wherein at least one of the positive electrode and the negative electrode is an electrode for a non-aqueous battery including a current collector and an electrode active material layer provided on a surface of the current collector, the electrode active material layer being obtained by applying and drying a slurry composition for a non-aqueous battery electrode, the slurry composition for a non-aqueous battery electrode containing an electrode active material and a binder composition for a non-aqueous battery electrode, and the binder composition for a non-aqueous battery electrode containing a binder and an ether compound represented by the formula (1).

Advantageous Effects of Invention

According to the binder composition for a non-aqueous battery electrode, the slurry composition for a non-aqueous battery electrode, the electrode for a non-aqueous battery, the slurry composition for a positive electrode of a non-aqueous battery, and the positive electrode for a non-aqueous battery of the present invention, a non-aqueous battery having a high initial discharge capacity in a high temperature environment can be produced. Further, the non-aqueous battery usually has a stable charge-discharge cycle at high temperatures.

The non-aqueous battery of the present invention provided with the positive electrode for a non-aqueous battery of the present invention has a high initial discharge capacity in a high temperature environment, and usually also has a stable charge-discharge cycle at high temperatures.

According to the electrolyte solution for a non-aqueous battery of the present invention, a non-aqueous battery having a high discharge capacity and an excellent stability of charge-discharge cycle at high temperatures can be obtained.

The non-aqueous battery of the present invention containing the electrolyte solution for a non-aqueous battery of the present invention has a high discharge capacity and a stable charge-discharge cycle at high temperatures.

DESCRIPTION OF EMBODIMENTS

Hereinbelow the present invention will be described in detail by showing embodiments and examples, and the like. However, the present invention is not limited to the embodiments, examples, and the like described later. The present invention may be appropriately modified without departing from the claims of the present application, and its equivalents.

[1. Binder Composition for Non-Aqueous Battery Electrode]

The binder composition for a non-aqueous battery electrode of the present invention (hereinbelow, appropriately referred to as "the binder composition of the present invention") contains at least a binder and an ether compound represented by the formula (1). Further, the binder composition of the present invention usually contains a solvent. The binder composition is prepared in a form of a solution or a dispersion liquid in which the binder is dissolved or dispersed in the solvent (these are collectively referred to hereinbelow as a "binder liquid"). When the binder composition of the present invention is a binder liquid, the ether compound represented by the formula (1) usually exists in a state of being dissolved in the solvent.

[1-1. Binder]

The binder is a component which retains an electrode active material in an electrode active material layer. As the binder, a polymer is usually used. The specific type of the binder is usually selected depending on the type of the solvent in which the binder is dissolved or dispersed.

For example, when the binder composition of the present invention is an aqueous binder liquid containing an aqueous solvent, usually polymer particles are used as a binder. Specific examples thereof may include diene-based polymer particles, acrylic-based polymer particles, fluorine-containing polymer particles, and silicon-based polymer particles. Among them, diene-based polymer particles and acrylic-based polymer particles are preferable since they are excellent in binding property with an electrode active material, and the strength and flexibility of the electrode for a non-aqueous battery of the present invention (the electrode may appropriately be referred to hereinbelow as "the electrode of the present invention").

The diene-based polymer particle is a particle of a polymer containing a monomer unit obtained by polymerizing a conjugated diene such as butadiene and isoprene (diene-based polymer). In the diene-based polymer, the ratio of the monomer unit obtained by the polymerization of the conjugated diene is usually equal to or higher than 40% by weight, preferably equal to or higher than 50% by weight, and more preferably equal to or higher than 60% by weight.

Examples of the diene-based polymer may include homopolymers of conjugated dienes such as polybutadiene and polyisoprene; copolymers of different types of conjugated dienes; and copolymers of conjugated dienes with a monomer copolymerizable with the conjugated diene. Examples of the co-polymerizable monomer may include $\alpha,\beta$-unsaturated nitrile compounds such as acrylonitrile and methacrylonitrile; unsaturated carboxylic acids such as acrylic acid and methacrylic acid; styrene-based monomers such as styrene, chlorostyrene, vinyltoluene, t-butylstyrene, vinylbenzoic acid, methyl vinylbenzoate, vinylnaphthalene, chloromethylstyrene, hydroxymethylstyrene, $\alpha$-methylstyrene, and divinylbenzene; olefins such as ethylene and propylene; halogen atom-containing monomers such as vinyl chloride and vinylidene chloride; vinyl esters such as vinyl acetate, vinyl propionate, vinyl butyrate, and vinyl benzoate; vinyl ethers such as methyl vinyl ether, ethyl vinyl ether, and butyl vinyl ether; vinyl ketones such as methyl vinyl ketone, ethyl vinyl ketone, butyl vinyl ketone, hexyl vinyl ketone, and isopropenyl vinyl ketone; and heterocyclic ring-containing vinyl compounds such as N-vinylpyrrolidone, vinylpyridine, and vinylimidazole. As the conjugated diene and co-polymerizable monomer, one species thereof may be solely used, or two or more species thereof may be used in combination at any ratio.

The acrylic-based polymer particle is a particle of a polymer containing a monomer unit obtained by polymerizing one or both of an acrylic acid ester and a methacrylic acid ester (acrylic-based polymer). The ratio of the monomer unit obtained by polymerizing one or both of an acrylic acid ester and a methacrylic acid ester in an acrylic-based polymer is usually equal to or higher than 40% by weight, preferably equal to or higher than 50% by weight, and more preferably equal to or higher than 60% by weight.

Examples of the acrylic-based polymer may include homopolymers of acrylic acid esters; homopolymers of methacrylic acid esters; copolymers of an acrylic acid ester and a methacrylic acid ester; and copolymers of one or both of an acrylic acid ester and a methacrylic acid ester and a monomer co-polymerizable with them. Examples of the co-polymerizable monomer may include unsaturated carboxylic acids such as acrylic acid, methacrylic acid, itaconic acid, and fumaric acid; carboxylic acid esters having two or more carbon-carbon double bonds such as ethylene glycol dimethacrylate, diethylene glycol dimethacrylate, and trimethylolpropane triacrylate; styrene-based monomers such as styrene, chlorostyrene, vinyltoluene, t-butylstyrene, vinylbenzoic acid, methyl vinylbenzoate, vinylnaphthalene, chloromethylstyrene, hydroxymethyl styrene, α-methylstyrene, and divinylbenzene; amide-based monomers such as acrylamide, N-methylolacrylamide, and acrylamide-2-methylpropanesulfonic acid; α,β-unsaturated nitrile compounds such as acrylonitrile and methacrylonitrile; olefins such as ethylene and propylene; diene-based monomers such as butadiene and isoprene; halogen atom-containing monomers such as vinyl chloride and vinylidene chloride; vinyl esters such as vinyl acetate, vinyl propionate, vinyl butyrate, and vinyl benzoate; vinyl ethers such as methyl vinyl ether, ethyl vinyl ether, and butyl vinyl ether; vinyl ketones such as methyl vinyl ketone, ethyl vinyl ketone, butyl vinyl ketone, hexyl vinyl ketone, and isopropenyl vinyl ketone; and heterocyclic ring-containing vinyl compounds such as N-vinyl pyrrolidone, vinyl pyridine, and vinyl imidazole. As the co-polymerizable monomer, one species thereof may be solely used, or two or more species thereof may be used in combination at any ratio.

When the binder composition of the present invention is a non-aqueous binder liquid containing a non-aqueous solvent, examples of the binder may include vinyl-based polymers such as polyethylene, polypropylene, polyisobutylene, polyvinyl chloride, polyvinylidene chloride, polyvinylidene fluoride, polytetrafluoroethylene, poly(vinyl acetate), poly(vinyl alcohol), poly(vinyl isobutyl ether), polyacrylonitrile, polymethacrylonitrile, poly(methyl methacrylate), poly(methyl acrylate), poly(ethyl methacrylate), allyl acetate, and polystyrene; diene-based polymers such as polybutadiene and polyisoprene; ether-based polymers containing a heteroatom in the main chain such as polyoxymethylene, polyoxyethylene, polycyclic thioether, and polydimethyl siloxane; condensed ester-based polymers such as polylactone polycyclic anhydride, polyethylene terephthalate, and polycarbonate; and condensed amide-based polymers such as nylon6, nylon66, poly-m-phenylene isophthalamide, poly-p-phenyleneterephthalamide, and polypyromellitimide. Moreover, the diene-based polymer particles and acrylic-based polymer particles may be dispersed or dissolved in an organic solvent, and the resultant may be used as a non-aqueous binder liquid.

As the binder, a material having a crosslink structure or a material having a functional group introduced by modification may also be used.

As the binder, one species thereof may be solely used, or two or more species thereof may be used in combination at any ratio.

Among them, an acrylic-based polymer that is a saturated polymer having no unsaturated bond in the main chain of the polymer is preferably used as a binder for a positive electrode since it has excellent resistance against oxidation during charging. Further, as the binder for a negative electrode, a diene-based polymer is preferably used since it has excellent resistance against reduction and strong binding power can be obtained. Usually, the binder composition of the present invention is particularly suitable for producing a positive electrode. Therefore, it is preferable that the binder contains an acrylic-based polymer. Since the acrylic-based polymer has excellent resistance against oxidation during charging, the polymer does not inhibit formation of a stable protective film in the mechanism which will be described later. Therefore, the combination of the ether compound represented by the formula (1) with, among those binders, especially the acrylic-based polymer can bring about effective suppression of decrease in discharge capacity due to the ether compound.

The glass transition temperature (Tg) of the binder may be appropriately selected depending on the purposes of use, and is usually equal to or higher than −150° C., preferably equal to or higher than −50° C., and more preferably equal to or higher than −35° C., and usually equal to or lower than +100° C., preferably equal to or lower than +25° C., and more preferably equal to or lower than +5° C. When the glass transition temperature Tg of the binder falls within this range, properties such as the flexibility, binding property, and winding property of the electrode of the present invention and the adhesion of an electrode active material layer with a current collector are highly balanced, thus being suitable.

The method for producing the binder for use in the present invention is not particularly limited. For example, any method such as a solution polymerization method, a dispersion polymerization method, a suspension polymerization method, a bulk polymerization method, and an emulsion polymerization method may be used. As the polymerization reaction, any reaction such as ion polymerization, radical polymerization, and living radical polymerization may be used. Examples of a polymerization initiator for use in the polymerization may include organic peroxides such as lauroyl peroxide, diisopropyl peroxydicarbonate, di-2-ethylhexyl peroxydicarbonate, t-butyl peroxypivalate, and 3,3,5-trimethylhexanoyl peroxide, azo compounds such as α,α'-azobisisobutyronitrile, ammonium persulfate, and potassium persulfate. Among them, a dispersion polymerization method, emulsion polymerization method, and suspension polymerization method in an aqueous solvent are preferable since it is preferable that the binder is an acrylic-based polymer and that the binder is in a state of dispersed particles.

When the binder is in a form of particles in the binder composition of the present invention, the mean particle diameter of the binder is preferably equal to or larger than 50 nm and more preferably equal to or larger than 70 nm, and preferably equal to or smaller than 500 nm and more preferably equal to or smaller than 400 nm. When the mean particle diameter falls within this range, the strength and flexibility of the electrode of the present invention become favorable. As the mean particle diameter of the binder, a particle diameter at which accumulated volume calculated from the smallest diameter side in the particle diameter distribution measured by a laser diffraction method comes up to 50% (50% volume cumulative diameter) may be employed.

[1-2. Ether Compound]

The binder composition of the present invention contains an ether compound represented by the following formula (1).

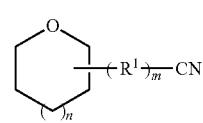

(1)

In the formula (1), m and n each independently represent 0 or 1. In particular, it is preferable that n is 0. That is, it is preferable that the ether ring of the ether compound represented by the formula (1) is a 5-membered ring.

In the formula (1), $R^1$ represents a divalent linear hydrocarbon group which may have in the bond thereof one or more intervening groups selected from the group consisting of an oxygen atom, a sulfur atom, and a carbonyl group. It is preferable that the divalent linear hydrocarbon group is a hydrocarbon group having no double bond or triple bond between carbon atoms (that is, linear saturated hydrocarbon group).

When the linear hydrocarbon group does not have a double bond and a triple bond, a stable charge-discharge cycle at high temperatures can be achieved. $R^1$ may have only one intervening group that is any of the aforementioned oxygen atom, sulfur atom and carbonyl group, or may have two or more intervening groups. The aforementioned intervening oxygen atom, sulfur atom and carbonyl group may be present in the middle of the carbon-carbon bond of the linear hydrocarbon group in $R^1$, or may be present in the middle of the bond at its terminal. In particular, it is preferable that the intervening group is present in any one of the middles of the carbon-carbon bonds of the linear hydrocarbon group in $R^1$ and the middle of the terminal bond binding to the ether ring.

It is preferable that $R^1$ is a divalent linear hydrocarbon group which may have in the bond thereof one or more intervening groups selected from the group consisting of —O—, —S—, —C(=O)—O—, and —O—C(=O)—. In this enumeration, —C(=O)—O— and —O—C(=O)— are listed in a distinguished manner. This intends to clarify that the orientation of the ester bond intervening in the bond of the linear hydrocarbon group is not limited. Among linking groups that intervene in the middle of the bond of the divalent linear hydrocarbon group, —O— is preferable. The compound having such a structure in the bond does not prevent insertion and extraction of lithium ions in the mechanism which will be described later, and therefore can realize high discharge capacity.

The number of carbon atoms in $R^1$ is usually equal to or greater than 1 and usually equal to or smaller than 20, preferably equal to or smaller than 10, and more preferably equal to or smaller than 8. It is supposed that the number of carbon atoms in $R^1$ falling within the range results in formation of a favorable film in the mechanism which will be described later, whereby the charge-discharge cycle is stabilized at high temperatures.

Among the aforementioned enumeration, $R^1$ is preferably a group represented by the following formula (2). In the formula (2), the terminal bond on the left side of the formula is bound to the ether ring, and the terminal bond on the right side of the formula is bound to a cyano group.

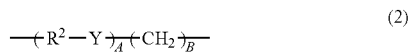
(2)

In the formula (2), A represents 0 or 1.
In the formula (2), Y represents any one selected from the group consisting of —O—, —S—, —C(=O)—O—, and —O—C(=O)—. Among them, —O— is preferable.

In the formula (2), $R^2$ represents a divalent linear hydrocarbon group of 1 to 16 carbon atoms which may have in the bond thereof one or more intervening groups selected from the same group as those for Y (that is, a divalent group selected from the group consisting of —O—, —S—, —C(=O)—O—, and —O—C(=O)—). In particular, the number of carbon atoms of the linear hydrocarbon group in $R^2$ is preferably equal to or smaller than 10, and more preferably equal to or smaller than 6 since thereby the effect can be obtained more reliably and synthesis can be performed at a lower cost when the ether compound represented by the formula (1) is used in a non-aqueous battery.

In the formula (2), Y and the intervening group which may be present in the middle of a bond of $R^2$ may be the same group or different groups as long as the groups are any of the four groups: —O—, —S—, —C(=O)—O—, and —O—C(=O)—.

In the formula (2), B represents an integer of 0 to 11. In particular, B is preferably equal to or larger than 1 and equal to or smaller than 8, and more preferably equal to or smaller than 6 since it is supposed that thereby a favorable stable protective film is formed in the mechanism which will be described later when the binder composition containing the ether compound represented by the formula (1) is used in a non-aqueous battery and the battery exhibits excellent charge and discharge property at high temperatures.

In the formula (1), it is preferable that the group "—$(R^1)_m$—CN" is bound to the ether ring at the carbon atom of the ether ring that is bound to the oxygen atom. That is, it is preferable that the ether compound represented by the following formula (1) is represented by the following formula (3). In the formula (3), m, n, and $R^1$ are the same as in the formula (1).

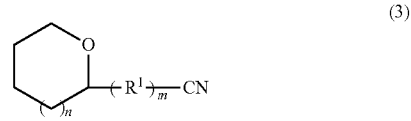
(3)

Examples of the ether compound represented by the formula (1) may be as follows.
However, the ether compound represented by the formula (1) is not limited to the following examples since the requirement for exhibiting the effects of the present invention is the presence of a cyclic ether structure and a cyano group in the ether compound represented by the formula (1).

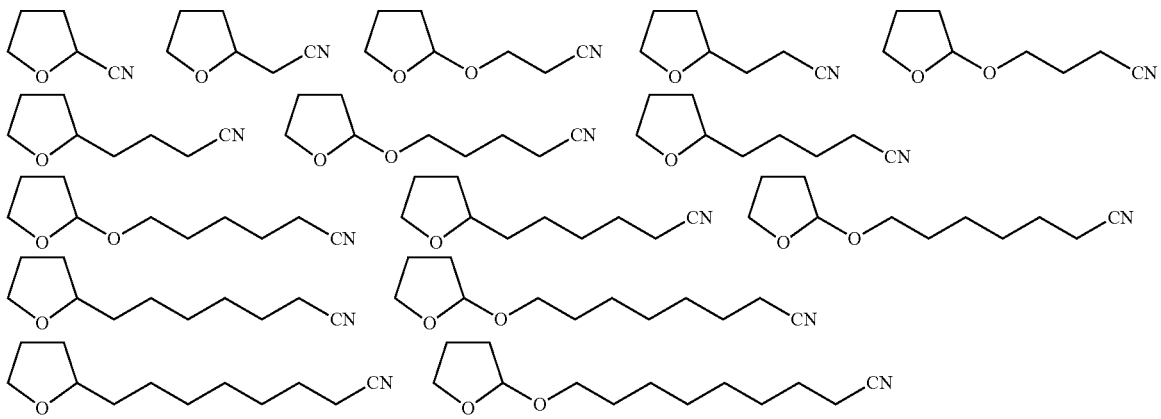

-continued
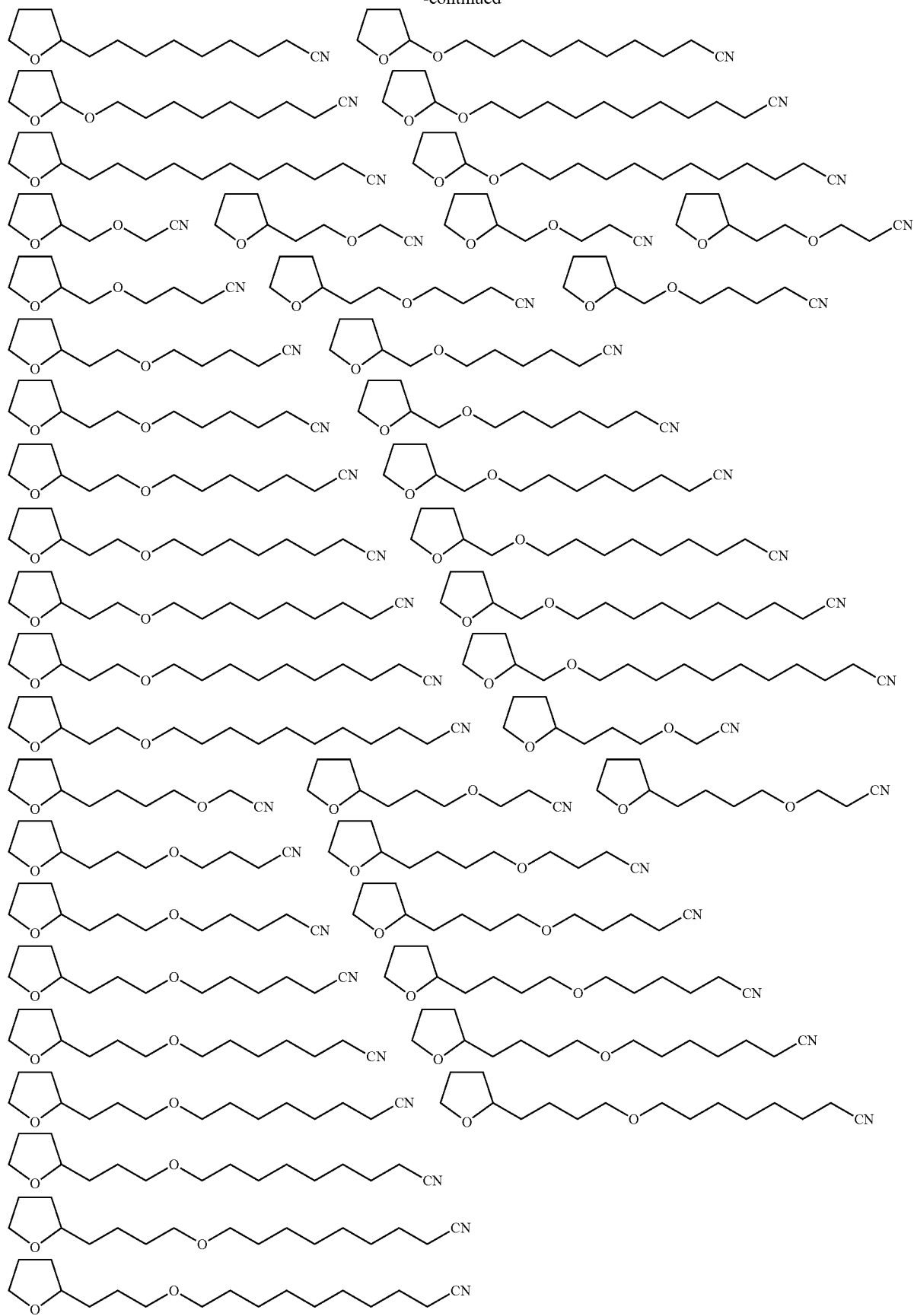

-continued
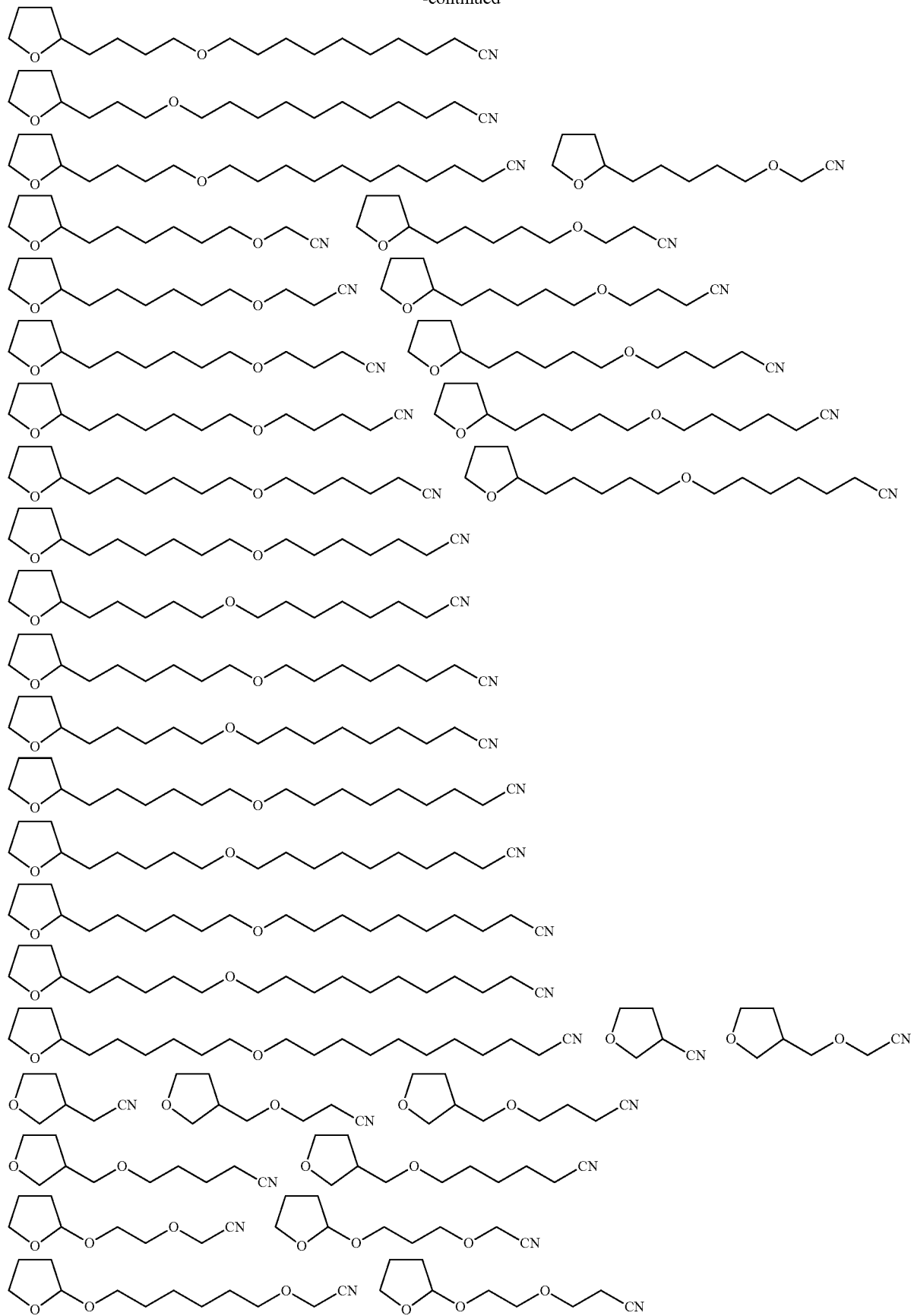

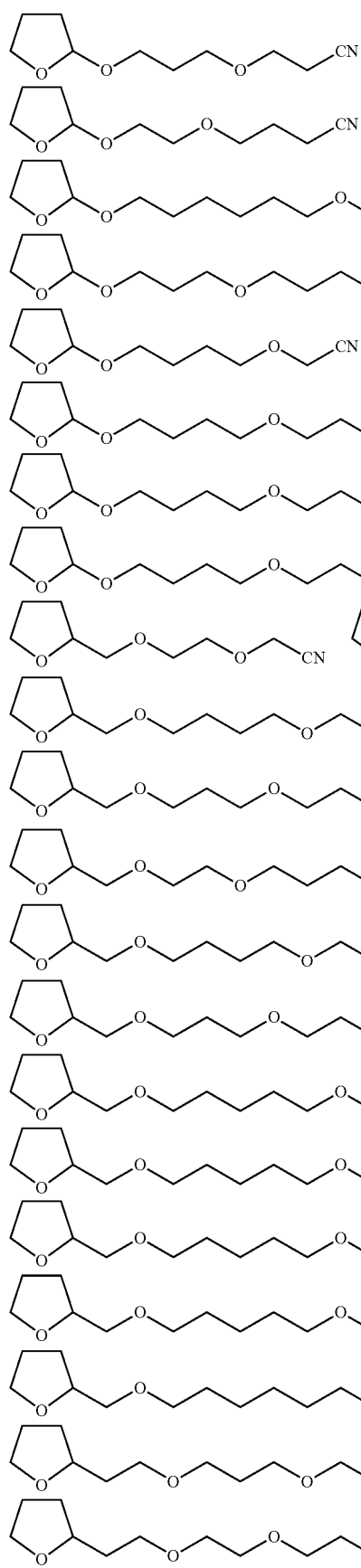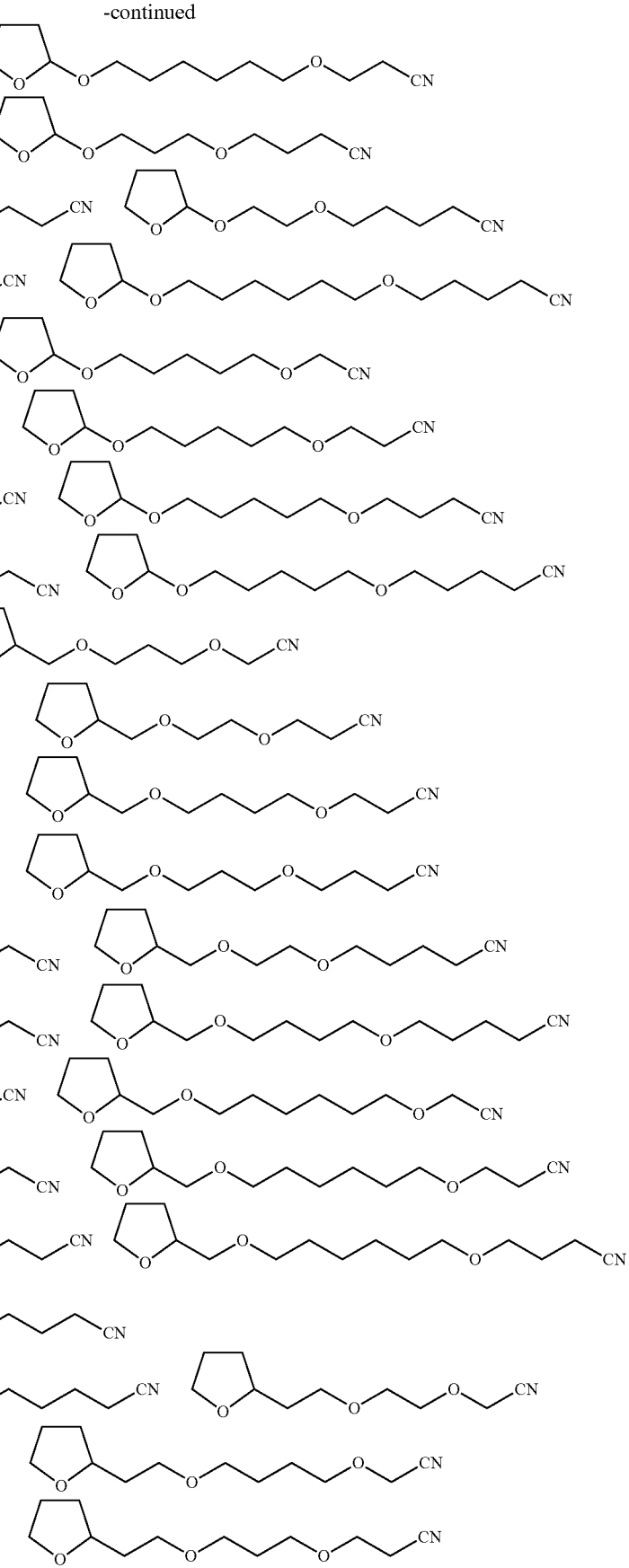

-continued
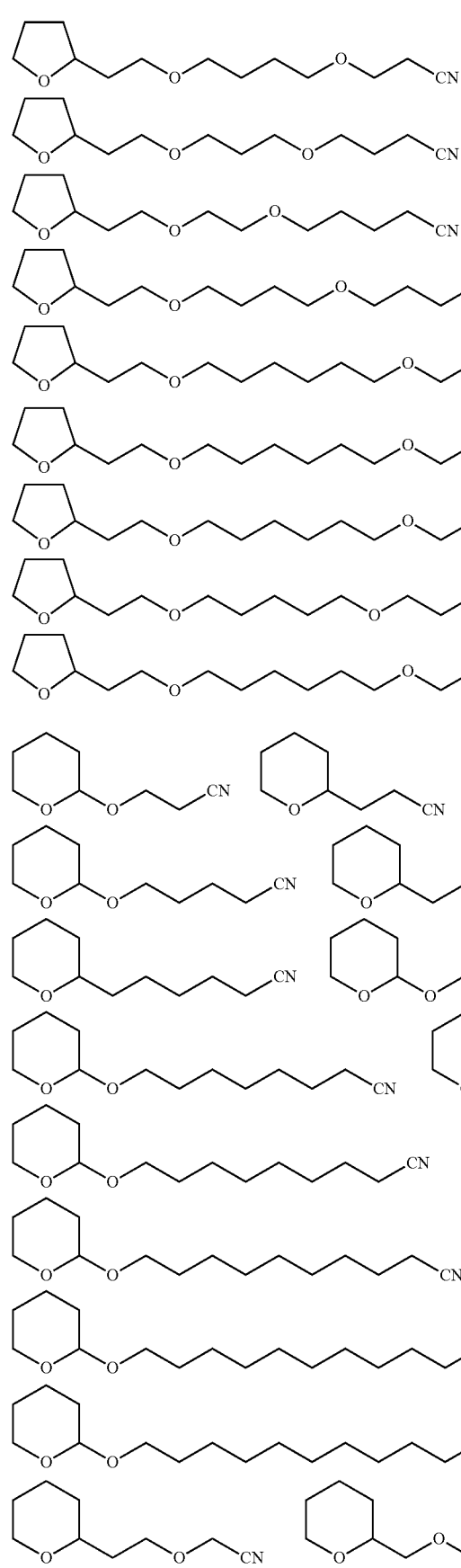
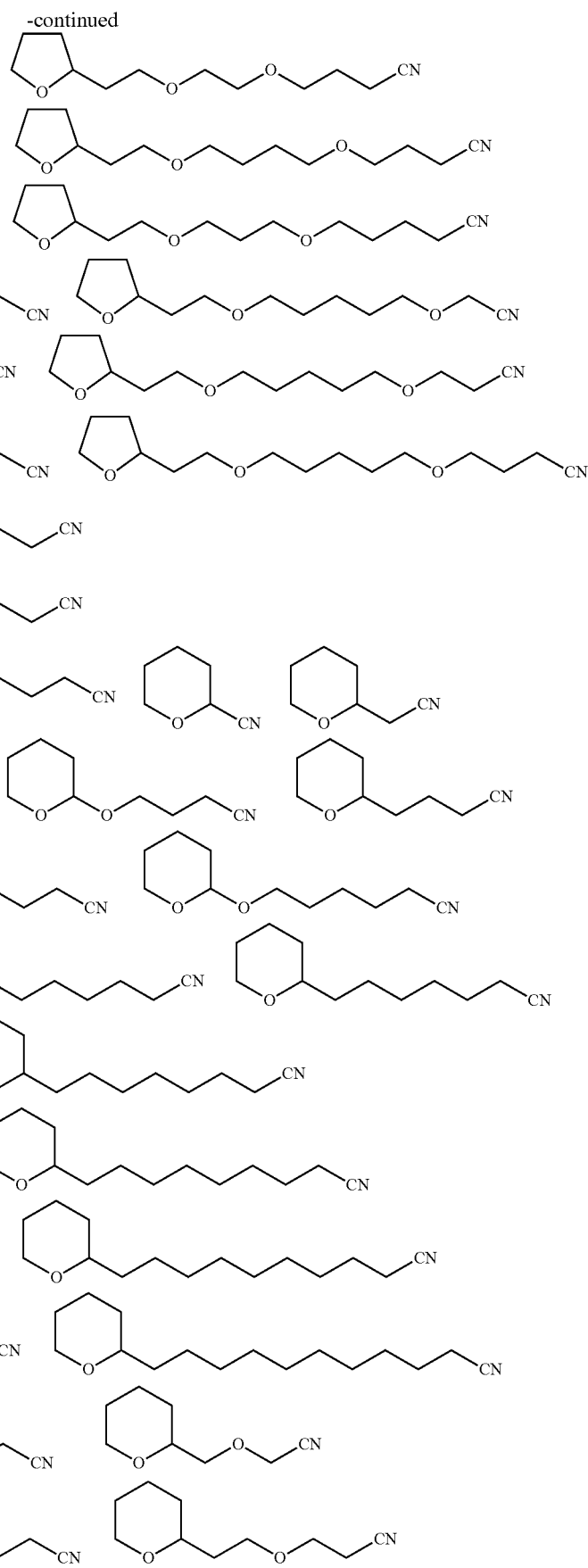

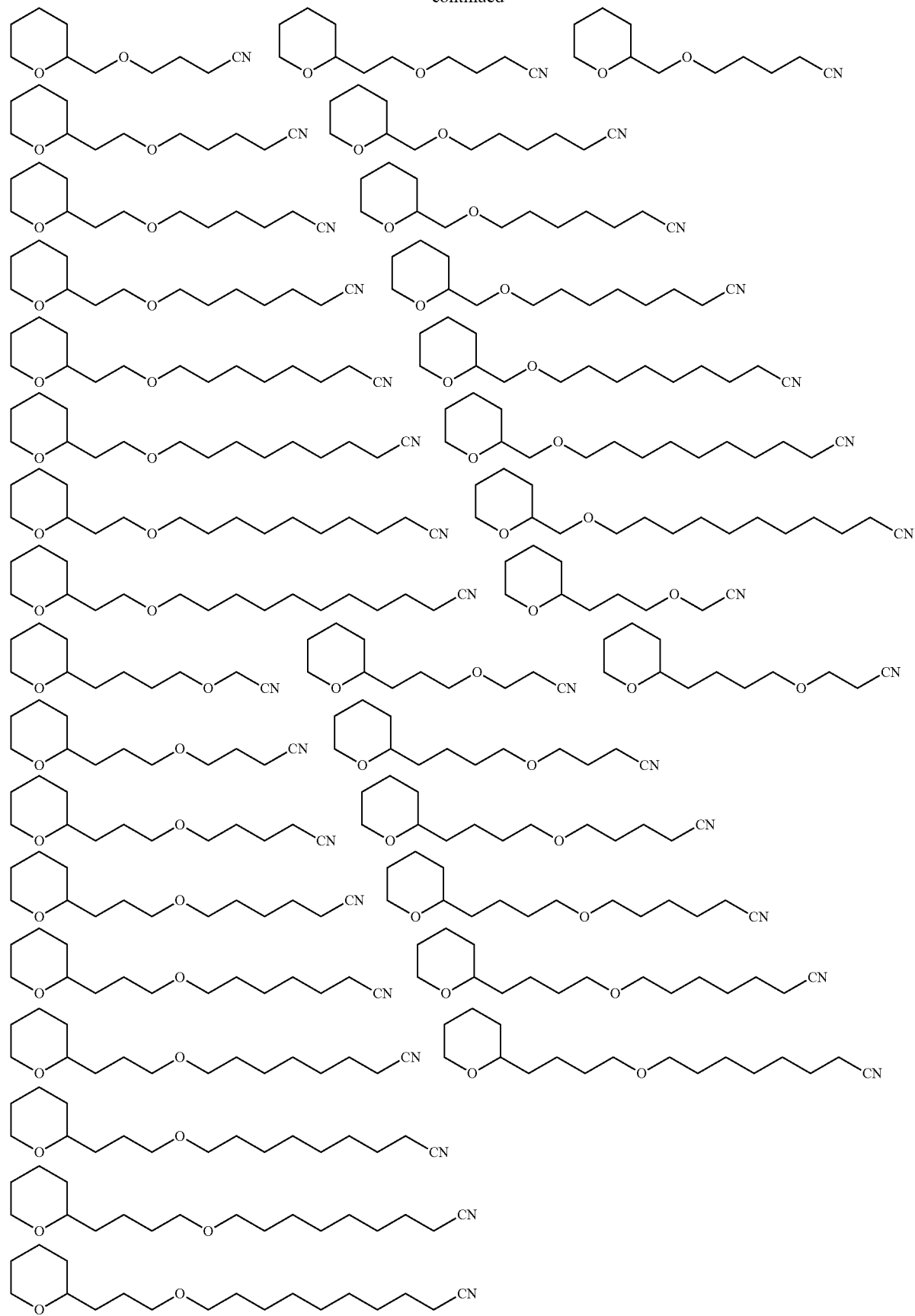

-continued
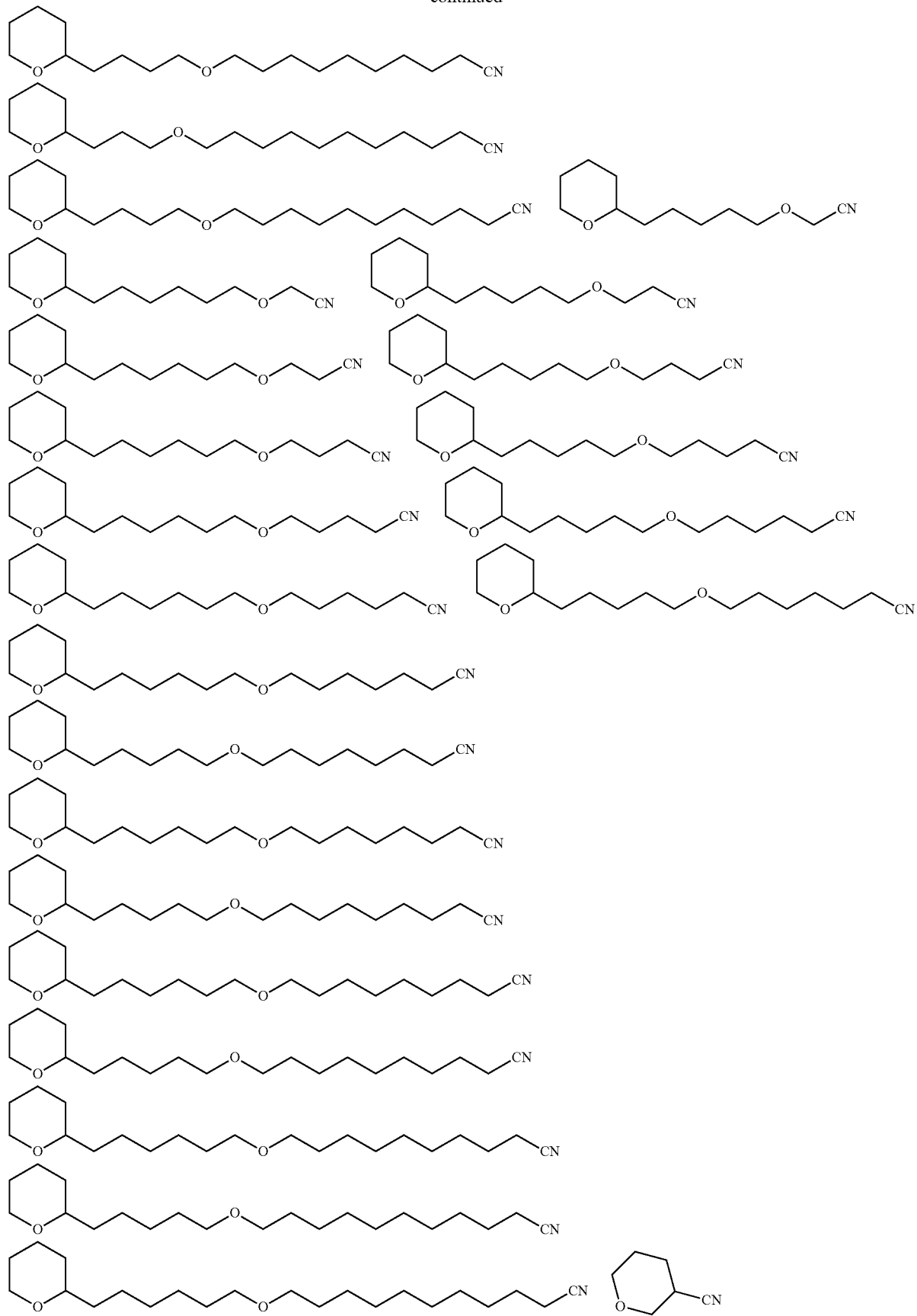

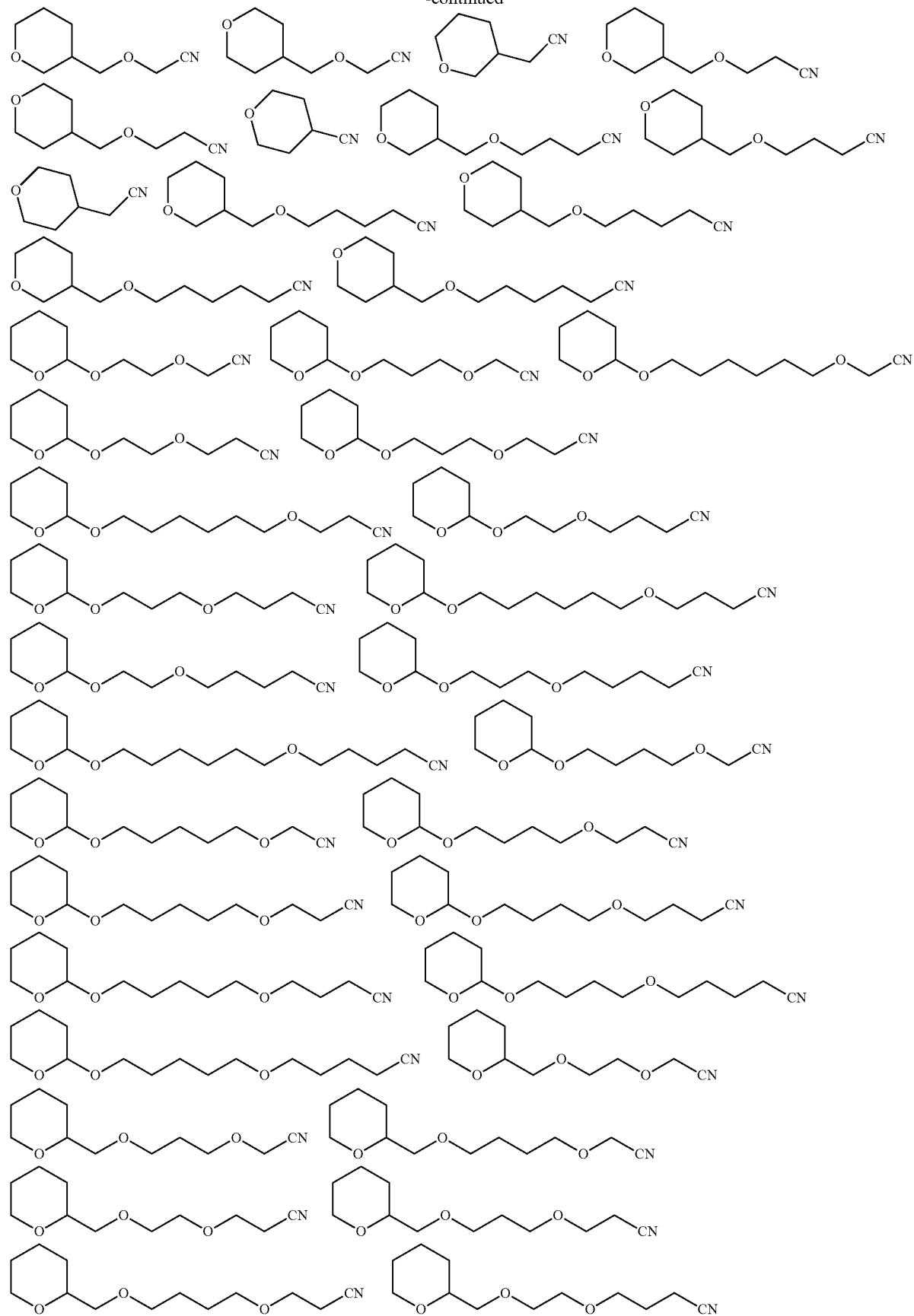

-continued
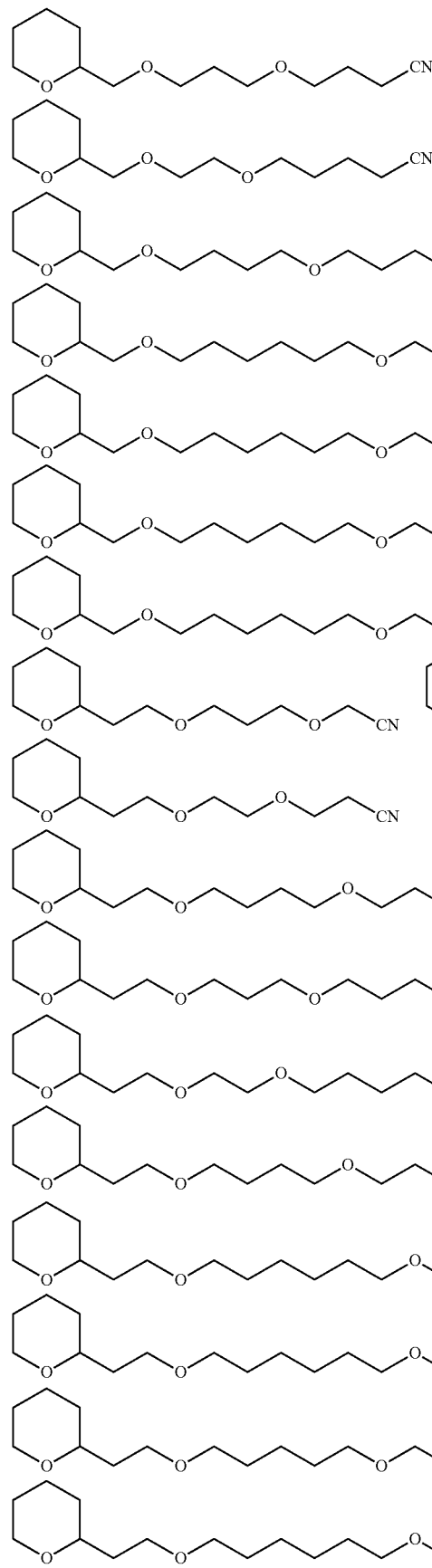
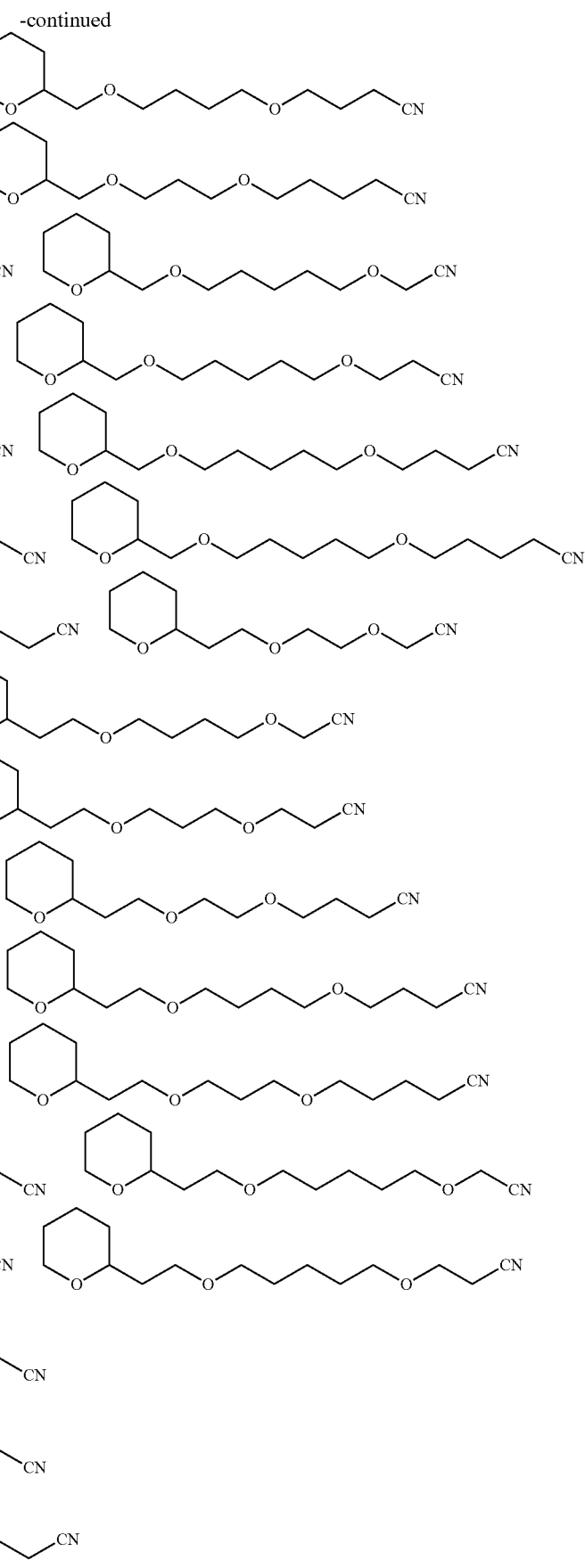

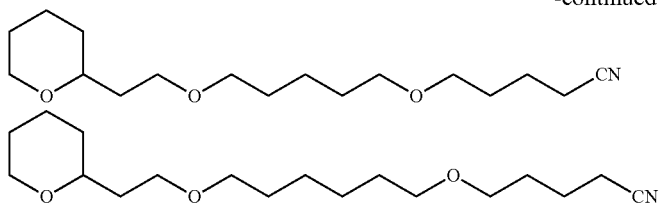

The method for producing the ether compound represented by the formula (1) is not limited, and a general method for synthesizing an ether or an acetal may be applicable. For example, the ether compound may be produced by the following synthetic methods, but the production method is not limited to these synthetic methods.

I. A method in which an alcohol is reacted with a base such as sodium hydride to activate the alcohol, and the activated alcohol is reacted with a halide having a cyano group.

II. A method in which an alcohol is derivatized into an active ester, and the active ester is reacted with a cyanohydrin or a halide having a cyano group in the presence of a base.

III. A method in which an alcohol and an olefin having a cyano group are subjected to an addition reaction in the presence of a base.

IV. A method in which an alcohol and an olefin having a cyano group are subjected to an addition reaction in the presence of an acid.

In synthesis of a halide having a cyano group, an olefin having a cyano group, or a cyanohydrin which are used in the aforementioned reaction, a cyano group is usually introduced into a precursor of each compound. As the method for introducing a cyano group, methods that are publicly known and publicly used may be applicable. For example, synthesis is performed by the following synthetic methods, but the method is not limited to these synthetic methods.

i. A method in which an aldehyde is reacted with a hydroxylamine derivative to form an oxime derivative, which is derived into a cyano group.

ii. A method in which a halide is reacted with an alkali cyanide compound typified by KCN and NaCN.

iii. A method utilizing the Sandmeyer reaction using an amine compound as a starting material.

iv. A method in which an aldehyde is reacted with hydrogen cyanide.

The amount of the ether compound represented by the formula (1) contained in the binder composition of the present invention is preferably equal to or more than 1 part by weight, more preferably equal to or more than 3 parts by weight, and particularly preferably equal to or more than 5 parts by weight, and preferably equal to or less than 200 parts by weight, more preferably equal to or less than 100 parts by weight, and particularly preferably equal to or less than 50 parts by weight, with respect to 100 parts by weight of the binder. When the amount of the ether compound represented by the formula (1) is equal to or more than the lower limit of the aforementioned range, the charge-discharge cycle at high temperatures can be stabilized more reliably. Further, when the ether compound represented by the formula (1) in an amount falling within the range is contained, a sufficient effect can be stably obtained. The upper limit of the range is thus determined.

When the binder composition of the present invention contains the ether compound represented by the formula (1), the initial discharge capacity of the non-aqueous battery using the binder composition of the present invention in a high temperature environment can be increased, and usually it is further possible to improve stability of the charge-discharge cycle of the non-aqueous battery in a high temperature environment. Accordingly, it is possible to realize a non-aqueous battery having a high discharge capacity and usually further having an excellent stability of charge-discharge cycle in a high temperature environment.

The ether compound represented by the formula (1) has excellent selective properties that are excellent resistance against reduction and low resistance against oxidation. Such selective properties of the ether compound represented by the formula (1) are due to a combination of a cyclic ether structure and a cyano group. The ether compound represented by the formula (1) is highly stable at a reductive electronic potential, and is decomposed at a specific oxidative electronic potential, whereby a stable protective film can be formed on the surface of an electrode. Since the stable protective film has a cyano group, the film has a high polarity that is close to the polarity of a non-aqueous electrolyte solution. Therefore, the stable protective film does not inhibit, but rather promotes, the insertion and extraction of lithium ions into and from the electrode. It is considered that thereby the initial discharge capacity can be improved. Further, the stable protective film usually suppresses the decomposition of a non-aqueous electrolyte solution. It is assumed that thereby the non-aqueous battery has a stable charge-discharge cycle. The present invention is based on the aforementioned mechanism, and it has been confirmed that that sufficient effects can thereby be obtained.

[1-3. Solvent]

As previously discussed, in the process of producing an electrode, the binder composition of the present invention is often prepared as a binder liquid containing a solvent. In this case, the binder composition of the present invention may be an aqueous binder liquid containing an aqueous solvent as the solvent or a non-aqueous binder liquid containing a non-aqueous solvent as the solvent. As the aqueous solvent, water is usually used. Further, as the non-aqueous solvent, an organic solvent is usually used. In particular, N-methyl pyrrolidone (NMP) is preferable. As the solvent that the binder composition of the present invention contains, one species thereof may be solely used, or two or more species thereof may be used in combination at any ratio. It is particularly preferable that the binder composition of the present invention is an aqueous binder liquid.

When the binder composition of the present invention contains a solvent, the amount of the solvent is determined so that the solid content concentration of the binder composition of the present invention is usually equal to or higher than 15% by weight, preferably equal to or higher than 20% by weight, and more preferably equal to or higher than 30% by weight, and usually equal to or lower than 70% by weight, preferably equal to or lower than 65% by weight, and more preferably equal to or lower than 60% by weight. The solid content concentration falling within this range realizes good workability in production of the slurry composition for a non-aqueous battery electrode of the present invention (appropriately referred to hereinbelow as "the slurry composition of the present invention").

[1-4. Optional Component]

In addition to the binder, the ether compound represented by the formula (1) and the solvent, the binder composition of the present invention may contain an optional component as long as the effects of the present invention are not significantly impaired. Examples of the optional component may be the same as the optional component which may be contained in the slurry composition of the present invention which will be described later. The binder composition of the present invention may contain only one species of the optional component, or may contain a combination of two or more species thereof at any ratio.

[1-5. Method for Producing Binder Composition for Non-Aqueous Battery Electrode]

The method for producing the binder composition of the present invention is not limited. When an aqueous solvent is used as the solvent, the production may be performed by, for example, subjecting the monomer of the binder to emulsion polymerization in water. Further, when a non-aqueous solvent is used as the solvent, the production may be performed by, for example, replacing the solvent in the aforementioned binder composition using the aqueous solvent with an organic solvent. The binder composition of the present invention contains the ether compound represented by the formula (1), and the ether compound represented by the formula (1) may be mixed either before or after the polymerization.

[2. Slurry Composition for Non-Aqueous Battery Electrode]

The slurry composition for a non-aqueous battery electrode of the present invention (that is, the slurry composition of the present invention) contains at least an electrode active material and the binder composition of the present invention. Therefore, the slurry composition of the present invention contains at least an electrode active material, the binder, and the ether compound represented by the formula (1). Further, the slurry composition of the present invention usually contains a solvent.

[2-1. Electrode Active Material]

As the electrode active material, a suitable material may be used depending on the type of the battery of the present invention. In the following description, the electrode active material for a positive electrode is appropriately referred to as a "positive electrode active material" and the electrode active material for a negative electrode is appropriately referred to as a "negative electrode active material". In the present invention, preferable examples of the non-aqueous battery may include a lithium secondary battery and a nickel metal hydride secondary battery. In the following, electrode active materials suitable for a lithium secondary battery and a nickel metal hydride secondary battery will be described.

Firstly, the types of the electrode active material for a lithium secondary battery will be described.

The positive electrode active material for a lithium secondary battery is roughly classified into those composed of an inorganic compound and those composed of an organic compound. Examples of the positive electrode active material including an inorganic compound may include transition metal oxides, composite oxides of lithium and transition metal, and transition metal sulfides. Examples of the transition metal may include Fe, Co, Ni, and Mn. Specific examples of the positive electrode active material composed of an inorganic compound may include lithium-containing composite metal oxides such as $LiCoO_2$, $LiNiO_2$, $LiMnO_2$, $LiMn_2O_4$, $LiFePO_4$, and $LiFeVO_4$; transition metal sulfides such as $TiS_2$, $TiS_3$, and amorphous $MoS_2$; and transition metal oxides such as $Cu_2V_2O_3$, amorphous $V_2O$—$P_2O_5$, $MoO_3$, $V_2O_5$ and $V_6O_{13}$. On the other hand, specific examples of the positive electrode active material composed of an organic compound may include electroconductive polymer compounds such as polyacetylene and poly-p-phenylene. Further, a positive electrode active material composed of a composite material that is a combination of an inorganic compound and an organic compound may also be used. For example, an iron-based oxide may be subjected to reduction-firing in the presence of a carbon source material to produce a composite material coated with carbon materials, and the composite material may be used as a positive electrode active material. An iron-based oxide tends to have poor electrical conductivity, but it may be used as a high performance positive electrode active material by forming such a composite material. Further, those obtained by partial element substitution of the aforementioned compound may also be used as a positive electrode active material.

As the positive electrode active material, one species thereof may be solely used, or two or more species thereof may be used in combination at any ratio. In addition, a mixture of the aforementioned inorganic compound and organic compound may be used as a positive electrode active material.

Examples of the negative electrode active material for a lithium secondary battery may include carbonaceous materials such as amorphous carbon, graphite, natural graphite, mesocarbon microbeads, and pitch-based carbon fiber; and electroconductive polymer compounds such as polyacene. Other examples may include metals such as silicon, tin, zinc, manganese, iron, and nickel, and alloys thereof; oxides of these metals and alloys; and sulfates of these metals and alloys. Further examples may include metal lithium; lithium alloys such as Li—Al, Li—Bi—Cd, and Li—Sn—Cd; and lithium transition metal nitrides. As an electrode active material, a material having a surface to which an electroconductivity imparting material adheres by a mechanical modifying method may also be used. As the negative electrode active material, one species thereof may be solely used, or two or more species thereof may be used in combination at any ratio.

Subsequently, the types of an electrode active material for a nickel metal hydride secondary battery will be described.

Examples of the positive electrode active material for a nickel metal hydride secondary battery may include nickel hydroxide particles. The nickel hydroxide particles may contain cobalt, zinc, cadmium, or the like in a solid solution state. The nickel hydroxide particles may have a surface coated with an alkaline-heat-treated cobalt compound. Further, the nickel hydroxy particles may contain additives including yttrium oxide, cobalt compounds such as cobalt oxide, metal cobalt, and cobalt hydroxide; zinc compounds such as metal zinc, zinc oxide, and zinc hydroxide; and rare earth compounds such as erbium oxide. As the positive electrode active material, one species thereof may be solely used, or two or more species thereof may be used in combination at any ratio.

As the negative electrode active material for a nickel metal hydride secondary battery, hydrogen-absorption alloy particles are usually used. The hydrogen-absorption alloy particles are not particularly limited as long as they can absorb hydrogen which is electrochemically generated in a non-aqueous electrolyte solution during charging of a non-aqueous battery and can easily release the absorbed hydrogen during discharging. Particles selected from the group consisting of $AB_5$ type-based, TiNi-based, and TiFe-based hydrogen-absorption alloys are particularly preferable. Specific examples thereof may include $LaNi_5$, $MmNi_5$ (Mm is a misch metal), and $LmNi_5$ (Lm is at least one species selected from rare earth elements including La), as well as multielement-type hydrogen-absorption alloy particles in which a part of Ni in these alloys is substituted with one or more species of element selected from the group consisting of Al, Mn, Co, Ti, Cu, Zn, Zr, Cr, and B. In particular, hydrogen-absorption alloy particles having a composition represented by a general formula: $LmNi_wCo_xMn_yAl_z$ (atom ratio values w, x, y, and z are positive numbers satisfying $4.80 \leq w+x+y+z \leq 5.40$) is suitable since micronization with the progress of charge-discharge cycle is suppressed and thereby the charge-discharge cycle life is improved. As the negative electrode active material, one species thereof may be solely used, or two or more species thereof may be used in combination at any ratio.

In both a lithium secondary battery and a nickel metal hydride secondary battery, the particle diameter of the electrode active material may be appropriately selected depending on configuration requirements of the non-aqueous battery.

From the viewpoints of improvement of battery properties such as rate property and cycle property, the diameter of 50% volume cumulative diameter of the positive electrode active material is usually equal to or larger than 0.1 μm and preferably equal to or larger than 1 μm, and usually equal to or smaller than 50 μm and more preferably equal to or smaller than 20 μm.

From the viewpoints of improvement of battery properties such as initial efficiency, rate property, and cycle property, the 50% volume cumulative diameter of the negative electrode active material is usually equal to or larger than 1 μm and preferably equal to or larger than 15 μm, and usually equal to or smaller than 50 μm and more preferably equal to or smaller than 30 μm.

When the 50% volume cumulative diameters of the positive electrode active material and the negative electrode active material fall within the aforementioned ranges, a secondary battery having excellent rate property and cycle property can be produced, and the slurry composition and electrode of the present invention can be easily handled during production.

[2-2. Binder]

The binder in the slurry composition of the present invention is the same as described in the section of the binder composition of the present invention. However, the amount of the binder in the slurry composition of the present invention with respect to 100 parts by weight of the electrode active material is preferably equal to or more than 0.1 parts by weight, more preferably equal to or more than 0.2 parts by weight, and particularly preferably equal to or more than 0.5 parts by weight, and preferably equal to or less than 5 parts by weight, more preferably equal to or less than 4 parts by weight, and particularly preferably equal to or less than 3 parts by weight. When the amount of the binder falls within the aforementioned range, it is possible to stably prevent the electrode active material from removal off the electrode without inhibition of the battery reaction.

[2-3. Ether Compound]

The ether compound represented by the formula (1) in the slurry composition of the present invention is the same as described in the section of the binder composition of the present invention. However, the amount of the ether compound represented by the formula (1) in the slurry composition of the present invention with respect to 100 parts by weight of the electrode active material is preferably equal to or more than 0.01 parts by weight, more preferably equal to or more than 0.1 parts by weight, and particularly preferably equal to or more than 0.2 parts by weight, and preferably equal to or less than 10 parts by weight, more preferably equal to or less than 5 parts by weight, and particularly preferably equal to or less than 2 parts by weight. When the amount of the ether compound represented by the formula (1) is equal to or more than the lower limit of the aforementioned range, the charge-discharge cycle at high temperatures can be stabilized more reliably. Further, when the ether compound represented by the formula (1) in an amount falling within the range is contained, a sufficient effect can be stably obtained. The upper limit of the aforementioned range is thus determined.

[2-4. Solvent]

The solvent in the slurry composition of the present invention is not limited as long as the binder is dissolved or dispersed in a form of particles in the solvent. When a solvent capable of dissolving a binder is used, the binder adheres to a surface to thereby stabilize the dispersion of the electrode active material and other components. It is preferable to select the specific type of the solvent from the viewpoints of drying speed and environmental factors.

As the solvent in the slurry composition of the present invention, either water or an organic solvent may be used. Examples of the organic solvent may include cyclic aliphatic hydrocarbons such as cyclopentane and cyclohexane; aromatic hydrocarbons such as toluene and xylene; ketones such as ethyl methyl ketone and cyclohexanone; esters such as ethyl acetate, butyl acetate, γ-butyrolactone, and ε-caprolactone; acylonitriles such as acetonitrile and propionitrile; ethers such as tetrahydrofuran and ethylene glycol diethyl ether; alcohols such as methanol, ethanol, isopropanol, ethylene glycol, and ethylene glycol monomethyl ether; and amides such as N-methylpyrrolidone and N,N-dimethylformamide. In particular, since it is preferable that the solvent in the binder composition of the present invention is water, it is particularly preferable that the solvent in the slurry composition of the present invention is also water. Further, the solvent in the binder composition of the present invention as it is may be used as the solvent in the slurry composition of the present invention. As the solvent in the slurry composition of the present invention, one species thereof may be solely used, or two or more species thereof may be used in combination at any ratio.

The amount of the solvent in the slurry composition of the present invention may be adjusted depending on the types of the electrode active material, the binder, and the like, so as to have a viscosity suitable for coating process. Specifically, the amount of the solvent for use is adjusted so that the concentration of the solid content including the electrode active material, the binder, and optional components contained if necessary in the slurry composition of the present invention is preferably equal to or more than 30% by weight and more preferably equal to or more than 40% by weight, and preferably equal to or less than 90% by weight and more preferably equal to or less than 80% by weight.

[2-5. Optional Component]

In addition to the electrode active material, the binder, the ether compound represented by the formula (1) and the solvent, the slurry composition of the present invention may contain an optional component as long as the effects of the present invention are not significantly impaired. The slurry composition of the present invention may contain only one species of the optional component, or may contain two or more species thereof.

For example, the slurry composition of the present invention may contain a thickening agent. As the thickening agent, a polymer soluble in the solvent of the slurry composition of the present invention is usually used. Examples of the thickening agent may include cellulose-based polymers such as carboxymethyl cellulose, methyl cellulose, and hydroxypropyl cellulose, and ammonium salts and alkali metal salts thereof; (modified) poly(meth)acrylic acid and ammonium salts and alkali metal salts thereof; polyvinyl alcohols such as (modified) polyvinyl alcohol, copolymers of acrylic acid or an acrylic acid salt and vinyl alcohol, and copolymers of maleic anhydride, maleic acid, or fumaric acid and vinyl alcohol; and polyethylene glycol, polyethylene oxide, polyvinylpyrrolidone, modified polyacrylic acid, oxidized starch, starch phosphate, casein, and a variety of modified starch. In the present invention, "(modified)poly" means "unmodified poly" or "modified poly," and "(meth)acrylic" means "acrylic" or "methacrylic". As the thickening agent, one species thereof may be solely used, or two or more species thereof may be used in combination at any ratio.

The using amount of the thickening agent is preferably 0.5 parts by weight to 1.5 parts by weight with respect to 100 parts by weight of the electrode active material. When the using amount of the thickening agent falls within this range, the coating property of the slurry composition of the present invention become favorable, and it is thus possible to achieve good adhesion of the electrode active material layer and the current collector.

For example, the slurry composition of the present invention may contain an electroconductivity imparting material (also referred to as an electroconductive material). Examples of the electroconductivity imparting material may include electroconductive carbon such as acetylene black, ketchen black, carbon black, graphite, vapor grown carbon fiber, and carbon nanotube; carbon powders such as graphite; and fibers and foils of a variety of metals. The use of the electroconductivity imparting material can improve mutual electric contact of electrode active materials. In particular, when used in a lithium secondary battery, the electroconductive imparting material can improve discharge rate property.

For example, the slurry composition of the present invention may contain a reinforcing material. Examples of the reinforcing material may include a variety of inorganic and organic spherical, plate-shaped, rod-shaped, and fiber-shaped fillers.

Each of the using amount of the electroconductivity imparting material and the using amount of the reinforcing agent with respect to 100 parts by weight of the electrode active material is usually equal to or more than 0 parts by weight and preferably equal to or more than 1 part by weight, and usually equal to or less than 20 parts by weight and preferably equal to or less than 10 parts by weight.

Further, in order to improve the stability and life duration of the battery of the present invention, the slurry composition of the present invention may contain trifluoropropylene carbonate, vinylene carbonate, catechol carbonate, 1,6-dioxaspiro[4,4]nonane-2,7-dione, 12-crown-4-ether, and the like, in addition to the aforementioned components.

[2-6. Method for Producing Slurry Composition for Non-Aqueous Battery Electrode]

The slurry composition of the present invention is obtained, for example, by mixing the electrode active material, the binder, the ether compound represented by the formula (1), the solvent, and optional components if necessary. However, since the slurry composition of the present invention is usually produced by using the binder composition of the present invention, when the solvent of the binder composition of the present invention can be used as the solvent of the slurry composition of the present invention, the solvent of the slurry composition of the present invention does not have to be mixed in addition to the solvent of the binder composition of the present invention.

The order of mixing components is not particularly limited, and for example, respective components may be supplied to a mixer together at a time and mixed simultaneously. However, when the electrode active material, the binder, the ether compound represented by the formula (1), the solvent, the electroconductivity imparting material, and the thickening agent are mixed as components of the slurry composition of the present invention, it is preferable that the electroconductivity imparting material and the thickening agent are mixed in the solvent to disperse the electroconductivity imparting material in a form of fine particles, and then the binder, the ether compound represented by the formula (1), and the electrode active material are mixed in this mixture. By this procedure, the dispersibility of the obtained slurry composition of the present invention is improved.

Examples of the mixer may include ball mills, sand mills, pigment dispersing machines, kneaders, ultrasonic dispersion machines, homogenizers, planetary mixers, and Hobart mixers. In particular, a ball mill is preferably used since aggregation of the electroconductivity imparting material and the electrode active material can be prevented.

The 50% volume cumulative diameter of the particles contained in the slurry composition of the present invention is preferably equal to or smaller than 35 μm, and further preferably equal to or smaller than 25 μm. When the 50% volume cumulative diameter of the particles contained in the slurry composition of the present invention falls within the aforementioned range, a homogeneous electrode having a high dispersibility of the electroconductivity imparting material can be obtained. Therefore, it is preferable that mixing by the mixer is performed to a degree at which the 50% volume cumulative diameter of the particles contained in the slurry composition of the present invention falls within the aforementioned range.

[3. Electrode for Non-Aqueous Battery]

The electrode for a non-aqueous battery of the present invention (that is, the electrode of the present invention) includes a current collector and an electrode active material layer provided on a surface of the current collector. The electrode active material layer may be provided on at least one side of the current collector, and preferably on both sides.

[3-1. Current Collector]

The material for the current collector is not particularly limited as long as the material has electrical conductivity and electrochemical durability. In view of having heat resistance, for example, metallic materials such as iron, copper, aluminum, nickel, stainless steel, titanium, tantalum, gold, and platinum are preferable. Among them, aluminum is particularly preferable as a material for the current collector for a positive electrode of a lithium secondary battery, and copper is particularly preferable as a material for the current collector for a negative electrode of a lithium secondary battery.

The shape of the current collector is not particularly limited, and is preferably in a form of a sheet having a thickness of approximately 0.001 mm to 0.5 mm.

The surface of the current collector is preferably roughened in advance of its use, for enhancing the adhesion strength of the electrode active material layer. Examples of the surface roughing method may include a mechanical polishing method, an electrolytic polishing method, and a chemical polishing method. In the mechanical polishing method, a coated abrasive to which abrasive particles adhere, grindstone, emery wheel, wire brush provided with steel wire, or the like is used.

Further, in order to enhance the adhesion strength and electroconductivity of the electrode active material layer, an intermediate layer may be formed on the surface of the current collector.

[3-2. Electrode Active Material Layer]

The electrode active material layer is a layer containing at least an electrode active material. The electrode active material layer for the electrode of the present invention is produced by applying and drying the slurry composition of the present invention. Therefore, the composition of a solid content contained in the electrode active material layer is usually the same as the composition of the solid content of the slurry composition of the present invention.

The method for applying the slurry composition of the present invention to a current collector is not particularly limited. Examples thereof may include a doctor blade method, a dip method, a reverse roll method, a direct roll method, a gravure method, an extrusion method, and a brush application method. As a result of the application of the slurry composition of the present invention to the current collector, the solid content (the electrode active material, the binder, and the like) of the slurry composition of the present invention adhere to the surface of the current collector to be in a form of a layer.

After the application of the slurry composition of the present invention, the solid content of the slurry composition of the present invention adhering in a form of layer is then dried. Examples of the drying method may include drying by warm air, hot air, or low humid air; vacuum drying; and drying by irradiation of infrared rays, far infrared rays, or electron beam. Thus, the electrode active material layer is formed on the surface of the current collector.

If necessary, heat-treatment may be performed after the application of the slurry composition of the present invention. The heat-treatment is performed usually at a temperature equal to or higher than 120° C. for 1 hour or longer.

It is preferable that the electrode active material layer is then pressurized by, for example, a mold press or a roll press. Pressurization can reduce the porosity of the electrode active material layer. The porosity is preferably equal to or more than 5% and more preferably equal to or more than 7%, and preferably equal to or less than 15% and more preferably equal to or less than 13%. Too low porosity might cause difficulty in elevating volumetric capacity, and might also increase tendency to cause peel-off of the electrode active material layer to induce defects. Too high porosity might cause decrease in charging efficiency and discharging efficiency.

When a curable polymer is used as the binder, it is preferable that the polymer is cured at an appropriate time after the application of the slurry composition of the present invention.

The thickness of the electrode active material layer at both the positive electrode and the negative electrode is usually equal to or thicker than 5 μm and preferably equal to or thicker than 10 μm, and usually equal to or thinner than 300 μm and preferably equal to or thinner than 250 μm.

[4. Non-Aqueous Battery: First Aspect]

In a first aspect, the non-aqueous battery of the present invention (that is, the battery of the present invention) has a positive electrode, a negative electrode, and a non-aqueous electrolyte solution, and at least one of the positive electrode and the negative electrode is the electrode of the present invention.

Components of the battery according to the first aspect of the present invention will be described. From here through the section [4-4. Method for producing non-aqueous battery], the "battery of the present invention" refers to the battery according to the first aspect of the present invention.

The battery of the present invention is usually a secondary battery, and may be, for example, a lithium secondary battery and a nickel metal hydride secondary battery. In particular, it is preferable that the battery of the present invention is a lithium secondary battery. Since the battery of the present invention has the electrode of the present invention produced using the binder composition of the present invention, the battery can have a high initial discharge capacity in a high temperature environment, and usually it is further possible to realize a stable charge-discharge cycle. In addition to the positive electrode, the negative electrode, and the non-aqueous electrolyte solution, the battery of the present invention may also have optional components such as a separator.

[4-1. Electrode]

In the battery of the present invention, the electrode of the present invention is used as at least one of the positive electrode and the negative electrode. The electrode of the present invention may be used as the positive electrode, the negative electrode or both the positive and negative electrodes. In particular, a stable protective film formed by the ether compound represented by the formula (1) is presumed to be formed on the positive electrode. Therefore, it is preferable that the electrode of the present invention is a positive electrode.

[4-2. Non-Aqueous Electrolyte Solution]

As the non-aqueous electrolyte solution in the battery of the present invention, the electrolyte solution composition for a non-aqueous battery of the present invention, which will be described later, may be employed. Alternatively, a non-aqueous electrolyte solution other than the electrolyte solution composition for a non-aqueous battery of the present invention may also be employed. From here through the section (4-2-4. Method for producing non-aqueous electrolyte solution), a non-aqueous electrolyte solution other than the electrolyte solution composition for a non-aqueous battery of the present invention, which may be used in the battery of the present invention, will be described.

The non-aqueous electrolyte solution usually contains at least an organic solvent and an electrolyte dissolved in the organic solvent.

(4-2-1. Organic Solvent)

The organic solvent for use may be suitably selected from solvents that are publicly known as solvents for the non-aqueous electrolyte solution. Examples thereof may include cyclic carbonates having no unsaturated bond, chain carbonates, cyclic ethers that do not have the structure represented by the formula (1), chain ethers, cyclic carboxylic acid esters, chain carboxylic acid esters, and phosphorus-containing organic solvents.

Examples of the cyclic carbonates having no unsaturated bond may include alkylene carbonates having a C2-C4 alkylene group such as ethylene carbonate, propylene carbonate, and butylene carbonate. Among them, ethylene carbonate and propylene carbonate are preferable.

Examples of the chain carbonates may include dialkyl carbonates having a C1-C4 alkyl group such as dimethyl carbonate, diethyl carbonate, di-n-propyl carbonate, ethylmethyl carbonate, methyl-n-propyl carbonate, and ethyl-n-propyl carbonate. Among them, dimethyl carbonate, diethyl carbonate, and ethylmethyl carbonate are preferable.

Examples of the cyclic ethers that do not have the structure represented by the formula (1) may include tetrahydrofuran, and 2-methyltetrahydrofuran.

Examples of the chain ethers may include dimethoxyethane, and dimethoxymethane.

Examples of the cyclic carboxylic acid esters may include γ-butyrolactone, and γ-valerolactone.

Examples of the chain carboxylic acid esters may include methyl acetate, methyl propionate, ethyl propionate, and methyl butyrate.

Examples of the phosphorus-containing organic solvents may include trimethyl phosphate, triethyl phosphate, dimethyl ethyl phosphate, methyl diethyl phosphate, ethylene methyl phosphate, and ethylene ethyl phosphate.

As the organic solvent, one species thereof may be solely used, or two or more species thereof may be used in combination at any ratio. Use of two or more species of compounds in combination is preferable. For example, a solvent having a high dielectric constant such as alkylene carbonates and cyclic carboxylic acid esters and a solvent having a low viscosity such as dialkyl carbonates and chain carboxylic acid esters are preferably used in combination since thereby the lithium ion conductivity is increased, and a high capacity can be obtained.

(4-2-2. Electrolyte)

As the electrolyte, any suitable material may be used depending on the type of the battery of the present invention. In the non-aqueous electrolyte solution, the electrolyte is usually in a state of being dissolved in an organic solvent as a supporting electrolyte. As the electrolyte, a lithium salt is usually used.

Examples of the lithium salt may include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Among them, $LiPF_6$, $LiClO_4$, $CF_3SO_3Li$, and $LiBF_4$ are preferable since they have high solubility in an organic solvent and show a high degree of dissociation. Use of an electrolyte having a high degree of dissociation increases the lithium ion conductivity, and therefore the lithium ion conductivity can be adjusted by selecting the type of the electrolyte.

As the electrolyte, one species thereof may be used alone, or two or more species thereof may be used in combination at any ratio.

The amount of the electrolyte in the non-aqueous electrolyte solution is usually equal to or more than 1% by weight and preferably equal to or more than 5% by weight, and usually equal to or less than 30% by weight, and preferably equal to or less than 20% by weight, with respect to 100% by weight of the non-aqueous electrolyte solution. Further, the electrolyte is usually used in a concentration of 0.5 mol/L to 2.5 mol/L depending on the type of the electrolyte. When the concentration of the electrolyte is too low or too high, the ion conductivity tends to decrease. Usually, the lower the concentration of the electrolyte is, the higher the swelling degree of polymer particles, i.e. the binder, becomes, and hence the lithium ion conductivity can be adjusted by adjusting the concentration of the electrolyte.

(4-2-3. Optional Component)

In addition to the organic solvent and the electrolyte, the non-aqueous electrolyte solution may also contain an optional component as long as the effects of the present invention are not significantly impaired. As the optional component, one species thereof may be solely used, or two or more species thereof may be used in combination at any ratio.

Examples of the optional component may include a cyclic carbonate ester having an unsaturated bond in the molecule, an overcharge preventing agent, a deoxidizing agent, a dehydrating agent, and other optional auxiliary agents.

The cyclic carbonate ester having an unsaturated bond in the molecule forms a stable protective film on the surface of a negative electrode. When the non-aqueous electrolyte solution contains a cyclic carbonate ester having an unsaturated bond in the molecule, the stability of the charge-discharge cycle of a non-aqueous battery can be further improved. Examples of the cyclic carbonate ester having an unsaturated bond in the molecule may include a vinylene carbonate compound, a vinylethylene carbonate compound, and a methylene ethylene carbonate compound.

Examples of the vinylene carbonate compound may include vinylene carbonate, methylvinylene carbonate, ethylvinylene carbonate, 4,5-dimethylvinylene carbonate, 4,5-diethylvinylene carbonate, fluorovinylene carbonate, and trifluoromethylvinylene carbonate.

Examples of the vinylethylene carbonate compound may include vinylethylene carbonate, 4-methyl-4-vinylethylene carbonate, 4-ethyl-4-vinylethylene carbonate, 4-n-propyl-4-vinylethylene carbonate, 5-methyl-4-vinylethylene carbonate, 4,4-divinylethylene carbonate, and 4,5-divinylethylene carbonate.

Examples of the methylene ethylene carbonate compound may include methylene ethylene carbonate, 4,4-dimethyl-5-methylene ethylene carbonate, and 4,4-diethyl-5-methylene ethylene carbonate.

Among them, vinylene carbonate and vinylethylene carbonate are preferable, and vinylene carbonate is particularly preferable. As the cyclic carbonate ester having an unsaturated bond in the molecule, one species thereof may be solely used, or two or more species thereof may be used in combination at any ratio.

When the non-aqueous electrolyte solution contains a cyclic carbonate ester having an unsaturated bond in the molecule, the concentration of the cyclic carbonate having an unsaturated bond in the molecule in 100% by weight of the non-aqueous electrolyte solution is usually equal to or more than 0.01% by weight, preferably equal to or more than 0.1% by weight, more preferably equal to or more than 0.3% by weight, and particularly preferably equal to or more than 0.5% by weight. When the non-aqueous electrolyte solution contains the cyclic carbonate ester having an unsaturated bond in the molecule in the aforementioned concentration, an effect of improving the cycle property of the battery of the present invention can be stably exhibited. In general, when the non-aqueous electrolyte solution contains a cyclic carbonate ester having an unsaturated bond in the molecule, the amount of gas generation during continuous charging may increase. However, such increase in the amount of gas generation can be suppressed by co-use thereof with the ether compound represented by the formula (1), whereby the charge-discharge cycle becomes stable. When the content of the cyclic carbonate ester having an unsaturated bond in the molecule is too large, the amount of gas generation tends to increase during storage at high temperatures. Therefore, the upper limit thereof is usually equal to or less than 8% by weight, preferably equal to or less than 4% by weight, and more preferably equal to or less than 3% by weight.

When the non-aqueous electrolyte solution contains a cyclic carbonate ester having an unsaturated bond in the molecule, the ratio (by weight) of the cyclic carbonate ester having an unsaturated bond in the molecule with respect to the ether compound represented by the formula (1) is usually equal to or more than 0.5 and preferably equal to or more than 1, and usually equal to or less than 80 and preferably equal to or less than 50. When the ratio of the cyclic carbonate ester having an unsaturated bond in the molecule is too large, the amount of gas generation tends to increase during storage at high temperatures. On the other hand, when it is too small, the effect of stabilizing the charge-discharge cycle may not be sufficiently exhibited.

Examples of the overcharge preventing agent may include aromatic compounds such as biphenyl, alkyl biphenyl, terphenyl, partially hydrogenated terphenyl, cyclohexylbenzene, t-butylbenzene, t-amylbenzene, diphenyl ether, and dibenzofuran; partial fluorides of the aforementioned aromatic compounds such as 2-fluorobiphenyl, o-cyclohexyl fluorobenzene, and p-cyclohexyl fluorobenzene; and fluorine-containing anisole compounds such as 2,4-difluoroanisole, 2,5-difluoroanisole, and 2,6-difloroanisole. As the overcharge preventing agent, one species thereof may be solely used, or two or more species thereof may be used in combination at any ratio.

When the non-aqueous electrolyte solution contains an overcharge preventing agent, the concentration of the overcharge preventing agent in 100% by weight of the non-aqueous electrolyte solution is usually 0.1 to 5% by weight. Rupture and ignition of a non-aqueous battery during overcharging and the like can be suppressed by the overcharge preventing agent contained therein.

In general, an overcharge preventing agent has higher reactivity at a positive electrode and a negative electrode than the solvent component of the non-aqueous electrolyte solution. Therefore, the overcharge preventing agent tends to react at a part of electrodes of which the activity is high during continuous charging and during storage at high temperatures. The reaction of the overcharge preventing agent largely elevates the internal resistance of the non-aqueous battery, and generates gas. This causes a remarkable decrease in charge-discharge cycle property and in charge-discharge cycle property at high temperatures. However, the use of the binder composition of the present invention can suppress decrease in charge-discharge cycle property.

Examples of the optional auxiliary agent may include carbonate compounds such as fluoroethylene carbonate, trifluoropropylene carbonate, phenylethylene carbonate, erythritan carbonate, spiro-bis-dimethylene carbonate, methoxyethyl-methyl carbonate, and catechol carbonate; carboxylic anhydrides such as succinic anhydride, glutaric anhydride, maleic anhydride, citraconic anhydride, glutaconic anhydride, itaconic anhydride, diglycolic anhydride, cyclohexane dicarboxylic anhydride, cyclopentane tetracarboxylic dianhydride, and phenyl succinic anhydride; sulfur-containing compounds such as ethylene sulfite, 1,3-propane sultone, 1,4-butane sultone, methyl methanesulfonate, busulfan, sulfolane, sulfolene, dimethylsulfone, tetramethylthiuram monosulfide, N,N-dimethylmethanesulfoneamide, and N,N-diethylmethanesulfoneamide; nitrogen-containing compounds such as 1-methyl-2-pyrrolidinone, 1-methyl-2-piperidone, 3-methyl-2-oxazolidinone, 1,3-dimethyl-2-imidazolidinone, and N-methylsuccinimide; hydrocarbon compounds such as heptane, octane, and cycloheptane; fluorine-containing aromatic compounds such as fluorobenzene, difluorobenzene, hexafluorobenzene, and benzotrifluoride; 1,6-dioxaspiro[4,4]nonane-2,7-dione; and 12-crown-4-ether. As the auxiliary agent, one species thereof may be solely used, or two or more species thereof may be used in combination at any ratio.

When the non-aqueous electrolyte solution contains an auxiliary agent, the concentration of the auxiliary agent in 100% by weight of the non-aqueous electrolyte solution is usually 0.1 to 5% by weight. The presence of the auxiliary agent can improve the capacity retaining property and cycle property after storage at high temperatures.

(4-2-4. Method for Producing Non-Aqueous Electrolyte Solution)

The non-aqueous electrolyte solution may be produced by, for example, dissolving an electrolyte and, if necessary, other components in an organic solvent. In the production of the non-aqueous electrolyte solution, it is preferable that each raw material is dehydrated in advance of mixing. It is desirable that dehydration is performed so that the water content becomes usually equal to or lower than 50 ppm, and preferably equal to or lower than 30 ppm.

[4-3. Separator]

The separator is a member provided between the positive electrode and the negative electrode for preventing short circuit of the electrodes. As the separator, a porous substrate having a pore portion is usually used. Examples of the separator may include (a) a porous separator having a pore portion, (b) a porous separator having a polymer coating layer formed on one or both sides, and (c) a porous separator having a porous coating layer containing inorganic fillers or organic fillers formed thereon.

As the (a) porous separator having a pore portion, a porous film having a fine pore diameter, which does not have electron conductivity and has ionic conductivity and high resistance against organic solvents, is used. Specific examples thereof may include microporous films formed of a resin such as a polyolefin-based polymer (for example, polyethylene, polypropylene, polybutene, and polyvinyl chloride), and a mixture or a copolymer thereof; microporous films formed of a resin such as polyethylene terephthalate, polycyclo olefin, polyether sulfone, polyamide, polyimide, polyimideamide, polyaramide, polycyclo olefin, nylon, and polytetrafluoroethylene; a woven material made of polyolefine-based fibers, or nonwoven fabric thereof; and an aggregate of insulating material particles.

Examples of the (b) porous separator having a polymer coating layer formed on one or both sides may include polymer films for a solid polymer electrolyte or a gel polymer electrolyte, such as polyvinylidene fluoride, polyethylene oxide, polyacrylonitrile, and a polyvinylidene fluoride hexafluoropropylene copolymer; and a gelled polymer coating layer.

Examples of the (c) porous separator having a porous coating layer containing inorganic fillers or organic fillers formed thereon may include a separator having a coated porous layer composed of an inorganic filler or an organic filler and a dispersant for the fillers.

Among them, the separator having a coated porous layer containing inorganic fillers or organic fillers and a dispersant for the fillers is preferable since thereby the film thickness of the whole separator can be decreased and the ratio of the active material in the battery can be increased to increase the capacity per volume.

The thickness of the separator is usually equal to or thicker than 0.5 μm and preferably equal to or thicker than 1 μm, and usually equal to or thinner than 40 μm, preferably equal to or thinner than 30 μm, and more preferably equal to or thinner than 10 μm. When the thickness falls within this range, the resistance caused by the separator in the battery decreases, and the workability during the production of a battery is improved.

[4-4. Method for Producing Non-Aqueous Battery]

The method for producing the battery of the present invention is not particularly limited. For example, a negative electrode and a positive electrode are stacked with a separator interposed therebetween, the resulting stack is rolled or folded in conformity with the shape of the battery and then put into a battery container, a non-aqueous electrolyte solution is poured in the battery container, and the container is sealed. If necessary, an overcurrent protection element such as an expanded metal, a fuse, and a PTC element; and a lead plate may be provided, whereby an increase in internal pressure of the battery and overcharge and overdischarge can be prevented. The shape of the battery may be any of laminate cell type, coin type, button type, sheet type, cylindrical type, rectangular, and flat type.

[5. Electrolyte Solution Composition for Non-Aqueous Battery]

The electrolyte solution composition for a non-aqueous battery of the present invention (appropriately referred to hereinbelow as the "electrolyte solution composition of the present invention") includes an organic solvent, an electrolyte dissolved in the organic solvent, and the ether compound represented by the formula (1).

[5-1. Organic Solvent]

Examples of the organic solvent used in the electrolyte solution composition of the present invention may be the same as described above (section (4-2-1. Organic solvent)).

[5-2. Electrolyte]

Specific examples of the electrolyte used in the electrolyte solution composition of the present invention, the using amount thereof, and other matters thereof may be the same as described above (section (4-2-2. Electrolyte)).

[5-3. Ether Compound]

Specific examples of the ether compound used in the electrolyte solution composition of the present invention, preferable examples thereof, a production method thereof, and other matters thereof may be the same as described above (section [1-2. Ether compound]).

The ether compound represented by the formula (1) contained in the electrolyte solution composition of the present invention can increase the discharge capacity of the non-aqueous battery containing the electrolyte solution composition of the present invention, and improve the stability of the charge-discharge cycle of the non-aqueous battery in a high temperature environment. Thus, the non-aqueous battery having the high discharge capacity and the excellent stability of the charge-discharge cycle at high temperatures can be realized.

The reason why the use of the electrolyte solution composition of the present invention can achieve both the high discharge capacity of the non-aqueous battery and the stable charge-discharge cycle at high temperatures at high levels in a balanced manner is uncertain. However, according to the studies by the present inventors, the reason is assumed as follows.

As an additive for suppressing decomposition of an electrolyte solution composition, vinylene carbonate has conventionally been known. It is considered that vinylene carbonate is decomposed during first charging and discharging to form a thin stable protective film on the surface of the active material of the negative electrode, to thereby suppress the decomposition of the electrolyte solution composition. Further, the stable protective film becomes a passage through which lithium ions pass during charging and discharging. Since vinylene carbonate has a highly polar carbonate structure, a stable protective film formed from vinylene carbonate is considered to have a high polarity that is close to the polarity of the electrolyte solution composition. It is assumed that therefore the resistance to insertion and extraction of lithium ions into and from the negative electrode through the stable protective film is decreased, and thereby battery properties are improved.

On the other hand, a compound forming a thin stable protective film on the positive electrode has not been conventionally known. In order to form a stable protective film on the positive electrode, the compound is required to have a high selectivity whereby the material is not decomposed at a negative electrode and is decomposed only at the positive electrode. Therefore, the compound therefor is required to have resistance against reduction at a negative electrode and capability to be oxidized at a positive electrode to form a stable protective film. However, a carbonate compound generally has a high resistance against oxidation and low resistance against reduction, and therefore does not act at the positive electrode. The vinylene carbonate also has high resistance against oxidation and low resistance against reduction, and therefore acts at the negative electrode but does not act at the positive electrode.

The ether compound represented by the formula (1) has an excellent selectivity that are an excellent resistance against reduction and a low resistance against oxidation. Cyclic ethers typified by a tetrahydrofuran compound have an excellent resistance against reduction, whereas the cyclic ethers also have comparatively low resistance against oxidation and tend to undergo ring opening polymerization. Deducing from this fact, it is considered that the high resistance against reduction and low resistance against oxidation of the ether compound represented by the formula (1) are caused by the presence of a cyclic ether structure in the ether compound represented by the formula (1).

Since the ether compound represented by the formula (1) has high resistance against reduction and low resistance against oxidation as described above, the compound is subjected to ring opening polymerization at a positive electrode (particularly a surface portion of the active material having a high activity) to form a thin stable protective film. It is considered that therefore the ether compound suppresses decomposition of the electrolyte solution composition. It is assumed that, by suppressing decomposition of the electrolyte solution composition of the present invention at the positive electrode as described above, the non-aqueous battery using the electrolyte solution composition of the present invention exhibits a stable charge-discharge cycle.

Further, the ether compound represented by the formula (1) has a cyano group as a highly polar functional group. Therefore, the stable protective film formed from the ether compound represented by the formula (1) is also considered to have a high polarity that is close to the polarity of the electrolyte solution composition. Therefore, the stable protective film formed at the positive electrode does not prevent the insertion and extraction of lithium ions into and from the positive electrode. It is assumed that therefore the stable protective film does not decrease the discharge capacity and can realize excellent battery properties such as high discharge capacity.

The concentration of the ether compound represented by the formula (1) contained in the electrolyte solution composition of the present invention is preferably equal to or more than 0.01% by weight, more preferably equal to or more than 0.05% by weight, and particularly preferably equal to or more than 0.1% by weight, and preferably equal to or less than 15% by weight, more preferably equal to or less than 10% by weight, and particularly preferably equal to or less than 5% by weight, with respect to 100% by weight of the electrolyte solution composition of the present invention. When the concentration of the ether compound represented by the formula (1) is equal to or more than the lower limit of the aforementioned range, the charge-discharge cycle at high temperatures can be stabilized more reliably. Further, when the ether compound represented by the formula (1) in a concentration falling within the aforementioned range is contained, a sufficient effect can be stably obtained. The upper limit of the range is thus determined.

[5-4. Optional Component]

In addition to the organic solvent, the electrolyte, and the ether compound represented by the formula (1), the electrolyte solution composition of the present invention may contain an optional component as long as the effects of the present invention are not significantly impaired. The electrolyte solution composition may contain only one species of the optional component, or may contain a combination of two or more species thereof at any ratio.

Examples of the optional component may include a cyclic carbonate ester having an unsaturated bond in the molecule, an overcharge preventing agent, a deoxidizing agent, a dehydrating agent, an optional auxiliary agent, and the like.

Specific examples and other matters of the cyclic carbonate ester having an unsaturated bond in the molecule may be the same as described above (section (4-2-3. Optional component)).

When the electrolyte solution composition of the present invention contains a cyclic carbonate ester having an unsaturated bond in the molecule, the concentration of the cyclic carbonate ester having an unsaturated bond in the molecule in 100% by weight of the electrolyte solution composition is usually equal to or more than 0.01% by weight, preferably equal to or more than 0.1% by weight, more preferably equal to or more than 0.3% by weight, and particularly preferably equal to or more than 0.5% by weight. When the concentration of the cyclic carbonate ester having an unsaturated bond in the molecule is too small, the effect of improving the cycle property of the non-aqueous battery may not be sufficiently obtained. In general, when an electrolyte solution composition contains a cyclic carbonate ester having an unsaturated bond in the molecule, the amount of gas generation during continuous charging may increase. However, such increase in the amount of gas generation can be suppressed by co-use thereof with the ether compound represented by the formula (1), whereby the charge-discharge cycle becomes stable. When the content of the cyclic carbonate ester having an unsaturated bond in the molecule is too large, the amount of gas generation tends to increase during storage at high temperatures. Therefore, the upper limit thereof is usually equal to or less than 8% by weight, preferably equal to or less than 4% by weight, and more preferably equal to or less than 3% by weight.

When the electrolyte solution composition of the present invention contains a cyclic carbonate ester having an unsaturated bond in the molecule, the ratio (by weight) of the cyclic carbonate ester having an unsaturated bond in the molecule with respect to the ether compound represented by the formula (1) is usually equal to or more than 0.5 and preferably equal to or more than 1, and usually equal to or less than 80 and preferably equal to or less than 50. When the ratio of the cyclic carbonate ester having an unsaturated bond in the molecule is too large, the amount of gas generation tends to increase during storage at high temperatures. On the other hand, when it is too small, the effect of stabilizing the charge-discharge cycle may not be sufficiently obtained.

Specific examples of an overcharge preventing agent, a deoxidizing agent, a dehydrating agent, and an optional auxiliary agent, the containing ratio thereof, and other matters thereof may be the same as described above (section (4-2-3. Optional component)).

[5-5. Method for Producing Electrolyte Solution Composition of the Invention]

The electrolyte solution composition of the present invention may be produced by, for example, dissolving an electrolyte, the ether compound represented by the formula (1), and if necessary, other components in an organic solvent. In the production of the electrolyte solution composition of the present invention, it is preferable that each raw material is dehydrated in advance of mixing. It is desirable that the dehydration is performed so that the water content becomes usually equal to or lower than 50 ppm, and preferably equal to or lower than 30 ppm.

[6. Non-Aqueous Battery: Second Aspect]

In a second aspect, the non-aqueous battery of the present invention has a positive electrode, a negative electrode, and an electrolyte solution, and has the electrolyte solution composition of the present invention as the electrolyte solution.

Components of the battery according to the second aspect of the invention will be described hereinbelow. From here through the section [6-3. Method for producing non-aqueous battery], the "battery of the present invention" refers to the battery according to the second aspect of the present invention.

The non-aqueous battery of the present invention is usually a secondary battery, and may be, for example, a lithium secondary battery or a nickel metal hydride secondary battery. In particular, it is preferable that the battery of the present invention is a lithium secondary battery. Since the non-aqueous battery of the present invention has the electrolyte solution composition of the present invention, the battery can achieve both a high discharge capacity and a stable charge-discharge cycle at high temperatures.

In addition to the positive electrode, the negative electrode, and the electrolyte solution composition of the present invention, the non-aqueous battery of the present invention may also have optional components such as a separator.

[6-1. Electrode]

As the electrode in the battery of the present invention, the aforementioned electrode of the present invention may be employed. Alternatively, electrodes other than the electrode of the present invention may also be employed. From here through the section (6-1-5. Method for producing electrode), an electrode other than the electrode of the present invention which may be used in the battery of the present invention will be described.

As the electrodes (positive electrode and negative electrode), an electrode having an electrode active material layer is usually used. The electrode active material layer is a layer containing at least an electrode active material. The layer usually contains an electrode active material and a binder. In this case, an electrode having the electrode active material layer on the surface of a current collector is usually used as the electrode.

(6-1-1. Electrode Active Material)

In the battery of the present invention, the matter regarding the electrode active material may be the same as described above (section [2-1. Electrode active material]).

(6-1-2. Binder)

In the battery of the present invention, the matter regarding a binder may be the same as described above (section [1-1. Binder]).

The amount of the binder with respect to 100 parts by weight of the electrode active material is preferably equal to or more than 0.1 parts by weight, more preferably equal to or more than 0.2 parts by weight, and particularly preferably equal to or more than 0.5 parts by weight, and preferably equal to or less than 5 parts by weight, more preferably equal to or less than 4 parts by weight, and particularly preferably equal to or less than 3 parts by weight. When the amount of the binder falls within the aforementioned range, it is possible to stably prevent the electrode active material from removal off the electrode without inhibition of the battery reaction.

As previously discussed, the binder is often prepared as a binder liquid in the production of the electrode. In this case, the binder liquid may be an aqueous binder liquid containing water as the solvent or a non-aqueous binder liquid containing an organic solvent as the solvent. As the solvent in the binder liquid, one species thereof may be solely used, or two or more species thereof may be used in combination at any ratio. In particular, it is preferable that the binder liquid is an aqueous binder liquid.

The aqueous binder liquid may be produced by, for example, emulsion polymerization of the monomer in water. Further, the non-aqueous binder liquid may be produced by replacing the solvent of the aqueous binder liquid with an organic solvent. The mean particle diameter of particles of the binder in the binder liquid is preferably equal to or larger than 50 nm and more preferably equal to or larger than 70 nm, and preferably equal to or smaller than 500 nm and more preferably equal to or smaller than 400 nm. When the mean particle diameter falls within this range, the strength and flexibility of the resulting electrode become favorable. As the mean particle diameter of particles of the binder, the 50% volume cumulative diameter may be employed.

The solid content concentration of the binder liquid is usually equal to or more than 15% by weight, preferably equal to or more than 20% by weight, and more preferably equal to or more than 30% by weight, and usually equal to or less than 70% by weight, preferably equal to or less than 65% by weight, and more preferably equal to or less than 60% by weight. The solid content concentration falling within this range realizes good workability in the production of a slurry used for formation of an electrode active material layer.

(6-1-3. Optional Components that May be Contained in Electrode Active Material Layer)

In addition to the electrode active material and the binder, the electrode active material layer may also contain an optional component. Examples of the optional component may include an electroconductivity imparting material, and a reinforcing material. The electrode active material layer may contain only one species of the optional component or may contain a combination of two or more species at any ratio.

Specific examples of the electroconductivity imparting material and the reinforcing material, the using amounts thereof, and other matters thereof may be the same as described above (section [2-5. Optional component]).

(6-1-4. Current Collector)

In the battery of the present invention, the matter regarding the current collector may be the same as described above (section [3-1. Current collector]).

(6-1-5. Method for Producing Electrode)

The electrode may be produced by, for example, forming the electrode active material layer on at least one side, and preferably both sides of the current collector. The electrode active material layer may be formed by pasting a slurry containing the electrode active material, the binder, and a solvent (hereinbelow appropriately referred to as a "slurry for formation of an electrode active material layer") to the current collector.

Specific examples of the solvent of the slurry for formation of an electrode active material layer, the using amount thereof, and other matters thereof may be the same as described above (section [2-4. Solvent]).

The slurry for formation of an electrode active material layer may contain a thickening agent and other optional components. Specific examples of the optional components, the using amount thereof, and other matters thereof may be the same as described above (section [2-5. Optional component]).

The slurry for formation of an electrode active material layer is obtained by mixing the electrode active material, the binder, the solvent, and, if necessary, the optional component. The binder is usually prepared as the binder liquid containing a solvent. Therefore, when the solvent of the binder liquid can be used as the solvent of the slurry for formation of an electrode active material layer, the solvent of the slurry for formation of an electrode active material layer does not have to be mixed in addition to the solvent of the binder liquid.

The order of mixing components is not particularly limited, and for example, respective components may be supplied to a mixer together at a time and mixed simultaneously. However, when the electrode active material, the binder, the solvent, the electroconductivity imparting material, and the thickening agent are mixed as components of a slurry for formation of an electrode active material layer, it is preferable that the electroconductivity imparting material and the thickening agent are mixed in the solvent to disperse the electroconductivity imparting material in a form of fine particles, and then the binder and the electrode active material are mixed in this mixture. By this procedure, the dispersibility of the slurry for formation of an electrode active material layer is improved.

Examples of the mixer may include ball mills, sand mills, pigment dispersing machines, kneaders, ultrasonic dispersion machines, homogenizers, planetary mixers, and Hobart mixers. In particular, a ball mill is preferably used since aggregation of the electroconductivity imparting material and the electrode active material can be prevented.

The 50% volume cumulative diameter of the particles in the slurry for formation of an electrode active material layer is preferably equal to or smaller than 35 µm, and more preferably equal to or smaller than 25 µm. When the 50% volume cumulative diameter of the particles contained in the slurry for formation of an electrode active material layer falls within the aforementioned range, a homogeneous electrode having a high dispersibility of the electroconductivity imparting material can be obtained.

The prepared slurry for formation of an electrode active material layer may be applied to the current collector, and, if necessary, dried and heat-treated, to effect binding of the solid content (electrode active material, etc.) of the slurry for formation of an electrode active material layer onto the surface of the current collector to be in a form of layers, whereby the electrode active material layer can be formed.

The method for applying the slurry for formation of an electrode active material layer to the current collector is not particularly limited. Examples thereof may include a doctor blade method, a dip method, a reverse roll method, a direct roll method, a gravure method, an extrusion method, and a brush application method.

Examples of the drying method may include methods including drying by warm air, hot air, or low humid air; vacuum drying; and drying by irradiation of infrared rays, far infrared rays, or electron beam.

The heat-treatment is performed usually at a temperature equal to or higher than 120° C. for 1 hour or longer.

It is preferable that the electrode active material layer is then pressurized by, for example, a mold press or a roll press. Pressurization can reduce the porosity of the electrode active material layer. The porosity is preferably equal to or more than 5% and more preferably equal to or more than 7%, and preferably equal to or less than 15% and more preferably equal to or less than 13%. Too low porosity might cause difficulty in elevating volumetric capacity, and might also increase tendency to cause peel-off of the electrode active material layer to induce defects. Too high porosity might cause decrease in charging efficiency and discharging efficiency.

When a curable polymer is used as the binder, it is preferable that the polymer is cured at an appropriate time after the application of the slurry for formation of an electrode active material layer.

The thickness of the electrode active material layer at both the positive electrode and the negative electrode is usually equal to or thicker than 5 μm and preferably equal to or thicker than 10 μm, and usually equal to or thinner than 300 μm and preferably equal to or thinner than 250 μm.

[6-2. Separator]

In the battery of the present invention, specific examples of a separator, the using amount thereof, and other matters thereof may be the same as described above (section [4-3. Separator]).

[6-3. Method for Producing Non-Aqueous Battery]

The matter regarding the method for producing the battery of the present invention may be the same as described above (section [4-4. Method for producing non-aqueous battery]).

EXAMPLES

The present invention will be specifically described hereinbelow with reference to Examples. However, the present invention is not limited to following Examples, and the present invention may be arbitrary modified for implementation without departing from the scope of claims and its equivalents. Unless otherwise specified, part and % that represent the amount in the following description are on a weight basis.

Preparation of Ether Compound

Preparative Example 1-1

Preparation of Compound 1-1

(Tetrahydrofuran-2-yl)acetonitrile (available from Tokyo Chemical Industry Co., Ltd.) was dehydrated and purified by distillation under reduced pressure using a Kugelrohr apparatus in the presence of calcium hydride. Thus, the following compound 1-1 was prepared as an ether compound.

(Compound 1-1)

Preparative Example 1-2

Preparation of Compound 1-2

In a 4-necked reaction vessel equipped with a condenser, a thermometer and a dropping funnel, 25.5 g (0.64 mol) of sodium hydride having a content of 60% and 500 mL of tetrahydrofuran were placed under nitrogen gas stream. The mixture was cooled in an ice bath. 50 g (0.49 mol) of tetrahydrofurfuryl alcohol diluted with 200 mL of tetrahydrofuran was slowly added from the dropping funnel to the mixture in an ice bath. After then, reaction was performed at room temperature for 1 hour.

Subsequently, the reaction solution was cooled in an ice bath again. 75.25 g (0.64 mol) of 5-chlorovaleronitrile diluted with 100 mL of tetrahydrofuran was slowly added from the dropping funnel to the mixture. After the addition, the mixture was warmed to room temperature over 1 hour, and then heated to reflux for additional 3 hours.

After completion of the reaction, about 200 mL of tetrahydrofuran was distilled off under reduced pressure by a rotary evaporator to reduce the amount of the reaction solution. Then, 2 L of water was added to the reaction solution, and the mixture was extracted twice with 500 mL of ethyl acetate. After the separation, the resulting ethyl acetate layer was dried by adding sodium sulfate, and the sodium sulfate was removed by filtration. Ethyl acetate was removed under reduced pressure by a rotary evaporator to give 15 g of pale yellow oil.

The pale yellow oil was purified by silica gel column chromatography (hexane:ethyl acetate=1:1) to give 8.8 g of pale yellow oil (yield: 11.6%). The resulting pale yellow oil was subjected to distillation under reduced pressure using a Kugelrohr apparatus in the presence of calcium hydride to give 3.8 g of colorless oil (yield: 5.0%). Thus, the following compound 1-2 was prepared as an ether compound.

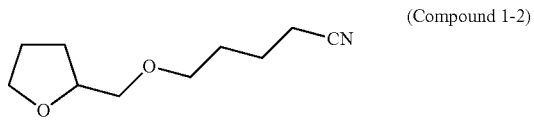 [SMILES: N#CCCCCOCC1CCCO1]
(Compound 1-2)

The structure of the compound 1-2 thus produced was identified by $^1$H-NMR. The results are shown below.

$^1$H-NMR (500 MHz, CDCl$_3$, TMS, δ ppm): 4.12-4.02 (m, 1H), 3.90-8.86 (m, 1H), 3.80-3.75 (m, 1H), 3.56-3.40 (m, 4H), 2.40 (t, 2H, J=6.5 Hz), 1.99-1.73 (m, 8H).

Preparative Example 1-3

Preparation of Compound 1-3

In a 4-necked reaction vessel equipped with a condenser, a thermometer and a dropping funnel, 352 g (3.45 mol) of tetrahydrofurfuryl alcohol and 238 g (4.48 mol) of acrylonitrile were placed under nitrogen gas stream. After then, 4.34 g (0.1 mol) of lithium hydroxide was added and reaction was performed at 60° C. for 10 hours.

After completion of the reaction, the reaction solution was cooled to room temperature, and added to 1,000 mL of 0.2 N hydrochloric acid aqueous solution.

Subsequently, the mixture was extracted twice with 300 mL of ethyl acetate. After the separation, the resulting ethyl acetate layer was washed with 500 mL of distilled water, and then with 500 mL of 10% sodium bicarbonate water. The ethyl acetate layer was dried by adding sodium sulfate, and the sodium sulfate was removed by filtration. Ethyl acetate was removed under reduced pressure by a rotary evaporator to give 350 g of pale yellow oil. The pale yellow oil was purified by silica gel column chromatography (hexane:ethyl acetate=1:1) to give 335 g of pale yellow oil. The pale yellow oil was subjected to distillation under reduced pressure in the presence of calcium hydride to give 183 g of compound 1-3 as a colorless liquid (yield: 34.2%). Thus, the following compound 1-3 was prepared as an ether compound.

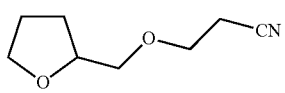
(Compound 1-3)

The structure of the compound 1-3 thus produced was identified by $^1$H-NMR.

$^1$H-NMR (500 MHz, CDCl$_3$, TMS, δ ppm): 4.08-4.03 (m, 1H), 3.91-3.85 (m, 1H), 3.79-3.71 (m, 3H), 3.58-3.52 (m, 1H), 3.51-3.48 (m, 1H), 2.65-2.62 (m, 2H), 2.00-1.85 (m, 3H), 1.67-1.60 (m, 1H).

Preparative Example 1-4

Preparation of Compound 1-4

In a 4-necked reaction vessel equipped with a condenser, a thermometer and a dropping funnel, 2.15 g (53.9 mmol) of sodium hydride having a content of 60% and 200 mL of anhydrous tetrahydrofuran were placed under nitrogen gas stream. The mixture was cooled in an ice bath. 5.0 g (49.0 mol) of tetrahydrofurfuryl alcohol diluted with 50 mL of tetrahydrofuran was slowly added from the dropping funnel to the mixture in an ice bath. The mixture was allowed to be slowly warmed back to room temperature, and reaction was performed at room temperature for 1 hour.

Subsequently, the reaction solution was warmed to 76° C., and 4.4 g (58.8 mmol) of chloroacetonitrile diluted with 50 mL of tetrahydrofuran was slowly added from the dropping funnel to the mixture. After completion of the dropwise addition, heating reaction was performed at 76° C. for 30 minutes. After then, the reaction solution was cooled to room temperature, and reaction was performed at room temperature for 20 hours.

After completion of the reaction, about 100 mL of tetrahydrofuran was distilled off under reduced pressure by a rotary evaporator to reduce the amount of the reaction solution. Then, 500 mL of water was added to the reaction solution, and the mixture was extracted twice with 200 mL of ethyl acetate. After the separation, the resulting ethyl acetate layer was dried by adding sodium sulfate, and the sodium sulfate was removed by filtration. Ethyl acetate was removed under reduced pressure by a rotary evaporator to give 5 g of pale yellow oil.

The pale yellow oil was purified by silica gel column chromatography (hexane:ethyl acetate=1:1) to give 4 g of pale yellow oil. The resulting pale yellow oil was subjected to distillation under reduced pressure using a Kugelrohr apparatus in the presence of calcium hydride to give 1.3 g of colorless oil (yield: 18.8%). Thus, the following compound 1-4 was prepared as an ether compound.

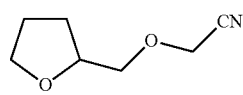
(Compound 1-4)

The structure of the compound 1-4 thus produced was identified by $^1$H-NMR.

$^1$H-NMR (500 MHz, CDCl$_3$, TMS, δ ppm): 4.37-4.35 (m, 2H), 4.11-4.06 (m, 1H), 3.92-3.86 (m, 1H), 3.82-3.76 (m, 1H), 3.69-3.64 (m, 1H), 3.58-3.53 (m, 1H), 2.04-1.86 (m, 3H), 1.67-1.58 (m, 1H).

[Preparation of Acrylic Polymer]
[Production of Binder (Acrylic-Based Polymer 1-1)]

10.75 Parts of 2-ethylhexyl acrylate, 1.25 parts of acrylonitrile, 0.12 parts of sodium laurylsulfate, and 40.0 parts of ion exchanged water were placed in a polymerization tank A, and 0.2 parts of ammonium persulfate as a polymerization initiator and 10 parts of ion exchanged water were further added. The mixture was warmed to 60° C. and stirred for 90 minutes.

66.95 Parts of 2-ethylhexyl acrylate, 18.6 parts of acrylonitrile, 2.0 parts of methacrylic acid, 0.2 parts of allyl methacrylate, 0.7 parts of sodium laurylsulfate, and 88 parts of ion exchanged water were placed in another polymerization tank B, and stirred to prepare an emulsion.

The emulsion prepared in the polymerization tank B was sequentially added to the polymerization tank A over about 180 minutes, and the mixture was stirred for about 120 minutes. When the amount of monomer consumption reached 95%, the mixture was cooled to complete the reaction. A dispersion liquid 1-1 in which particles of acrylic-based polymer 1-1 were dispersed in water was thereby obtained. The polymerization conversion rate measured from the solid content concentration was 92.6%. The solid content concentration of the resulting dispersion liquid 1-1 was 36.7%. The glass transition temperature Tg of the acrylic-based polymer 1-1 was −35.4° C.

[Production of Binder (Acrylic-Based Polymer 1-2)]

2.0 Parts of itaconic acid, 0.1 parts of sodium alkyl diphenyl ether disulfonate (Dow fax 2A1 available from The Dow Chemical Company), and 76.0 parts of ion exchanged water were placed in a polymerization tank A, and 0.6 parts of potassium persulfate as a polymerization initiator and 10 parts of ion exchanged water were further added. The mixture was warmed to 80° C. and stirred for 90 minutes.

76 Parts of 2-ethylhexyl acrylate, 20 parts of acrylonitrile, 2.0 parts of itaconic acid, 0.6 parts of sodium alkyl diphenyl ether disulfonate, and 60 parts of ion exchanged water were placed in another polymerization tank B, and stirred to prepare an emulsion.

The emulsion prepared in the polymerization tank B was sequentially added to the polymerization tank A over about 180 minutes, and the mixture was stirred for about 120 minutes. After the amount of monomer consumption reached 95%, 0.2 parts of ammonium persulfate and 5 parts of ion exchanged water were added to the mixture, and the mixture was warmed to 90° C., and stirred for 120 minutes, and cooled to complete the reaction. A dispersion liquid 1-2 in which particles of acrylic-based polymer 1-2 were dispersed in water was obtained. The polymerization conversion rate measured from the solid content concentration was 92.3%. The solid content concentration of the resulting dispersion liquid 1-2 was 38.3%. The glass transition temperature Tg of the acrylic-based polymer 1-2 was −37.0° C.

[Preparation of Binder]
[Production of Binder Composition 1-1]

In a 4-necked reaction vessel equipped with a thermometer, 100 g of the previously produced dispersion liquid 1-1 (solid content concentration: 36.7%) was placed under nitrogen gas stream. 8 g of the compound 1-1 produced in Preparative Example 1-1 was slowly added dropwise at room temperature under stirring with a small stirrer. After completion of the dropwise addition, the mixture was stirred at room temperature for 1 hour to produce a binder composition 1-1.

[Production of Binder Composition 1-2]

In a 4-necked reaction vessel equipped with a thermometer, 100 g of the previously produced dispersion liquid 1-1 (solid content concentration: 36.7%) was placed under nitrogen gas stream. 20 g of the compound 1-1 produced in Preparative Example 1-1 was slowly added dropwise at room temperature under stirring with a small stirrer. After completion of the dropwise addition, the mixture was stirred at room temperature for 1 hour to produce a binder composition 1-2.

[Production of Binder Composition 1-3]

In a 4-necked reaction vessel equipped with a thermometer, 100 g of the previously produced dispersion liquid 1-2 (solid content concentration: 38.3%) was placed under nitrogen gas stream. 8 g of the compound 1-1 produced in Preparative Example 1-1 was slowly added dropwise at room temperature under stirring with a small stirrer. After completion of the dropwise addition, the mixture was stirred at room temperature for 1 hour to produce a binder composition 1-3.

[Production of Binder Composition 1-4]

In a 4-necked reaction vessel equipped with a thermometer, 100 g of the previously produced dispersion liquid 1-1 (solid content concentration: 36.7%) was placed under nitrogen gas stream. 8 g of the compound 1-2 produced in Preparative Example 1-2 was slowly added dropwise at room temperature under stirring with a small stirrer. After completion of the dropwise addition, the mixture was stirred at room temperature for 1 hour to produce a binder composition 1-4.

[Production of Binder Composition 1-5]

In a 4-necked reaction vessel equipped with a thermometer, 100 g of the previously produced dispersion liquid 1-2 (solid content concentration: 38.3%) was placed under nitrogen gas stream. 8 g of the compound 1-2 produced in Preparative Example 1-2 was slowly added dropwise at room temperature under stirring with a small stirrer. After completion of the dropwise addition, the mixture was stirred at room temperature for 1 hour to produce a binder composition 1-5.

[Production of Binder Composition 1-6]

In a 4-necked reaction vessel equipped with a thermometer, 100 g of the previously produced dispersion liquid 1-1 (solid content concentration: 36.7%) was placed under nitrogen gas stream. The dispersion liquid was stirred at room temperature with a small stirrer for 1 hour without adding anything to produce a binder composition 1-6.

[Production of Binder Composition 1-7]

In a 4-necked reaction vessel equipped with a thermometer, 100 g of the previously produced dispersion liquid 1-1 (solid content concentration: 36.7%) was placed under nitrogen gas stream. 8 g of tetrahydrofuran was slowly added dropwise at room temperature under stirring with a small stirrer. After completion of the dropwise addition, the mixture was stirred at room temperature for 1 hour to produce a binder composition 1-7.

[Production of Binder Composition 1-8]

In a 4-necked reaction vessel equipped with a thermometer, 100 g of the previously produced dispersion liquid 1-1 (solid content concentration: 36.7%) was placed under nitrogen gas stream. 8 g of 2-methyltetrahydrofuran was slowly added dropwise at room temperature under stirring with a small stirrer. After completion of the dropwise addition, the mixture was stirred at room temperature for 1 hour to produce a binder composition 1-8.

[Production of Binder Composition 1-9]

In a 4-necked reaction vessel equipped with a thermometer, 100 g of the previously produced dispersion liquid 1-2 (solid content concentration: 38.3%) was placed under nitrogen gas stream. 8 g of 2-methyltetrahydrofuran was slowly added dropwise at room temperature under stirring with a small stirrer. After completion of the dropwise addition, the mixture was stirred at room temperature for 1 hour to produce a binder composition 1-9.

[Production of Binder Composition 1-10]

In a 4-necked reaction vessel equipped with a thermometer, 100 g of the previously produced dispersion liquid 1-1 (solid content concentration: 36.7%) was placed under nitrogen gas stream. 20 g of the compound 1-3 produced in Preparative Example 1-3 was slowly added dropwise at room temperature under stirring with a small stirrer. After completion of the dropwise addition, the mixture was stirred at room temperature for 1 hour to produce a binder composition 1-10.

[Production of Binder Composition 1-11]

In a 4-necked reaction vessel equipped with a thermometer, 100 g of the previously produced dispersion liquid 1-2 (solid content concentration: 38.3%) was placed under nitrogen gas stream. 8 g of the compound 1-3 produced in Preparative Example 1-3 was slowly added dropwise at room temperature under stirring with a small stirrer. After completion of the dropwise addition, the mixture was stirred at room temperature for 1 hour to produce a binder composition 1-11.

[Production of Binder Composition 1-12]

In a 4-necked reaction vessel equipped with a thermometer, 100 g of the previously produced dispersion liquid 1-1 (solid content concentration: 36.7%) was placed under nitrogen gas stream. 20 g of the compound 1-4 produced in Preparative Example 1-4 was slowly added dropwise at room temperature under stirring with a small stirrer. After completion of the dropwise addition, the mixture was stirred at room temperature for 1 hour to produce a binder composition 1-12.

[Production of Binder Composition 1-13]

In a 4-necked reaction vessel equipped with a thermometer, 100 g of the previously produced dispersion liquid 1-2 (solid content concentration: 38.3%) was placed under nitrogen gas stream. 8 g of the compound 1-4 produced in Preparative Example 1-4 was slowly added dropwise at room temperature under stirring with a small stirrer. After completion of the dropwise addition, the mixture was stirred at room temperature for 1 hour to produce a binder composition 1-13.

Example 1-1

Preparation of Carboxymethyl Cellulose Aqueous Solution

As an aqueous solution of carboxymethyl cellulose (appropriately referred to hereinbelow as "CMC") (CMC aqueous solution), an aqueous solution was prepared by adding water to carboxymethyl cellulose (trade name "BS-H", available from Dai-Ichi Kogyo Seiyaku Co., Ltd.) so that the solid content concentration was adjusted to 2%.

[Production of Slurry Composition for Positive Electrode]

100 Parts of $LiMn_2O_4$ as a positive electrode active material and 5 parts of acetylene black as an electroconductivity imparting material were mixed using a planetary mixer. To the resulting mixture, the CMC aqueous solution (solid content concentration: 2%) in an amount of 0.8 parts in terms of CMC was added, and mixing was performed for 60 minutes. The mixture was diluted with 5.5 mL of water, and the binder composition 1-1 was added so that the amount in terms of solid content was 1.0 part, and mixing was performed for 45 minutes. The mixture was subjected to a defoaming treatment to obtain a slurry composition 1-1 for a positive electrode. The composition was glossy and excellent in fluidity.

[Production of Positive Electrode]

The aforementioned slurry composition for a positive electrode was applied to an aluminum foil having a thickness of 18 μm using a 75 μm doctor blade and dried at 50° C. for 20 minutes, and then further dried at 110° C. for 20 minutes. The electrode thus produced was subjected to roll press to obtain a positive electrode having an electrode active material layer having a thickness of 50 μm. The positive electrode thus produced was dried at 105° C. for 1.5 hours immediately before manufacture of a battery, and then used.

[Production of Coin Cells (Half Cell) for Evaluation]

The positive electrode obtained in the aforementioned procedure was cut in a disc shape having a diameter of 12 mm. As a counterelectrode thereof, lithium metal was cut in a disc shape having a diameter of 14 mm. A single layer polypropylene separator (porosity: 55%) having a thickness of 25 μm was produced by dry method. This was cut in a disc shape having a diameter of 19 mm, to prepare a separator.

The disc-shaped positive electrode, the disc-shaped separator, and the disc-shaped lithium metal were placed in a coin-type outer container made of stainless steel (diameter: 20 mm, height: 1.8 mm, and stainless steel thickness: 0.25 mm) equipped with a polypropylene packing. Upon placement, the disc-shaped positive electrode was disposed so that the aluminum foil of the positive electrode was in contact with the bottom surface of the outer container. The disc-shaped separator was disposed between the positive electrode and the negative electrode. The disc-shaped lithium metal, i.e. the negative electrode, was disposed on the separator. Thus, the electrode active material layer of the positive electrode was opposed to the lithium metal via the separator. Then, a stainless steel plate having a thickness of 0.5 mm was placed on the lithium metal, and expanded metal was placed on the stainless steel plate. Subsequently, an electrolyte solution (available from Kishida Chemical Co., Ltd.) in which $LiPF_6$ was dissolved in a mixed solvent of ethylene carbonate and diethyl carbonate (ratio: ½ by volume) so that the concentration of $LiPF_6$ was 1 mol/L was poured into the container so that air did not remain therein, and a battery can was sealed to produce a coin cell (coin cell CR 2032) that was a lithium ion secondary battery having a diameter of 20 mm and a thickness of approximately 3.2 mm.

[Battery Evaluation Test]

Each of 10 coin cell batteries was charged to 4.8 V by a constant current method at 0.2 C under an atmosphere of 23° C., and then discharged at 0.2 C to 3.0 V. Subsequently, charging and discharging were repeated under an atmosphere of 60° C. wherein charging was performed by a constant current method at 0.5 C to 4.3 V and discharging was performed at 1.0 C to 3.0 V, whereby the electrical capacity was measured. The mean value of 10 cells was taken as a measurement value. The capacity maintenance ratio represented by the ratio (%) of the discharge capacity after completion of 100 cycles (discharge capacity after 100 cycles) and the discharge capacity after completion of 1 cycle under an atmosphere of 60° C. (initial discharge capacity) was calculated. High initial discharge capacity value represents high discharge capacity. High capacity maintenance ratio is considered to represent excellent high temperature cycle property. Further, high discharge capacity value after 100 cycles is considered to represent achievement of both high discharge capacity and a stable charge-discharge cycle at high temperatures at high levels in a balanced manner.

The evaluation results are summarized in Table 1.

Example 1-2

A binder composition, a slurry composition for a positive electrode, a positive electrode, and coin cells were produced and evaluated in the same manner as in Example 1-1 except that the binder composition 1-2 was used in place of the binder composition 1-1 in the production of the slurry composition for the positive electrode. The results are shown in Table 1.

Example 1-3

A binder composition, a slurry composition for a positive electrode, a positive electrode, and coin cells were produced and evaluated in the same manner as in Example 1-1 except that the binder composition 1-3 was used in place of the binder composition 1-1 in the production of the slurry composition for the positive electrode. The results are shown in Table 1.

Example 1-4

A binder composition, a slurry composition for a positive electrode, a positive electrode, and coin cells were produced and evaluated in the same manner as in Example 1-1 except that the binder composition 1-4 was used in place of the binder composition 1-1 in the production of the slurry composition for the positive electrode. The results are shown in Table 1.

Example 1-5

A binder composition, a slurry composition for a positive electrode, a positive electrode, and coin cells were produced and evaluated in the same manner as in Example 1-1 except that the binder composition 1-5 was used in place of the binder composition 1-1 in the production of the slurry composition for the positive electrode. The results are shown in Table 1.

Example 1-6

The coin cells for evaluation obtained by the same procedure as in Example 1-4 were subjected to the battery evaluation test in the same manner as in Example 1-4 except that the charging of the cells by a constant current method at 0.2 C under an atmosphere of 23° C. in the battery evaluation test was not performed upto 4.8 V but upto 4.3 V. The results are shown in Table 1.

Example 1-7

A binder composition, a slurry composition for a positive electrode, a positive electrode, and coin cells were produced and evaluated in the same manner as in Example 1-1 except that the binder composition 1-10 was used in place of the binder composition 1-1 in the production of the slurry composition for the positive electrode. The results are shown in Table 1.

Example 1-8

A binder composition, a slurry composition for a positive electrode, a positive electrode, and coin cells were produced and evaluated in the same manner as in Example 1-1 except that the binder composition 1-11 was used in place of the binder composition 1-1 in the production of the slurry composition for the positive electrode. The results are shown in Table 1.

Example 1-9

A binder composition, a slurry composition for a positive electrode, a positive electrode, and coin cells were produced and evaluated in the same manner as in Example 1-1 except that the binder composition 1-12 was used in place of the binder composition 1-1 in the production of the slurry composition for the positive electrode. The results are shown in Table 1.

Example 1-10

A binder composition, a slurry composition for a positive electrode, a positive electrode, and coin cells were produced and evaluated in the same manner as in Example 1-1 except that the binder composition 1-13 was used in place of the binder composition 1-1 in the production of the slurry composition for the positive electrode. The results are shown in Table 1.

Comparative Example 1-1

A binder composition, a slurry composition for a positive electrode, a positive electrode, and coin cells were produced and evaluated in the same manner as in Example 1-1 except that the binder composition 1-6 was used in place of the binder composition 1-1 in the production of the slurry composition for the positive electrode. The results are shown in Table 1.

Comparative Example 1-2

A binder composition, a slurry composition for a positive electrode, a positive electrode, and coin cells were produced and evaluated in the same manner as in Example 1-1 except that the binder composition 1-7 was used in place of the binder composition 1-1 in the production of the slurry composition for the positive electrode. The results are shown in Table 1.

Comparative Example 1-3

A binder composition, a slurry composition for a positive electrode, a positive electrode, and coin cells were produced and evaluated in the same manner as in Example 1-1 except that the binder composition 1-8 was used in place of the binder composition 1-1 in the production of the slurry composition for the positive electrode. The results are shown in Table 1.

Comparative Example 1-4

A binder composition, a slurry composition for a positive electrode, a positive electrode, and coin cells were produced and evaluated in the same manner as in Example 1-1 except that the binder composition 1-9 was used in place of the binder composition 1-1 in the production of the slurry composition for the positive electrode. The results are shown in Table 1.

Comparative Example 1-5

The coin cells for evaluation obtained by the same procedure as in Comparative Example 1-3 were subjected to the battery evaluation test in the same manner as in Comparative Example 1-3 except that charging of the battery by a constant current method at 0.2 C under an atmosphere of 23° C. in the battery evaluation test was not performed upto 4.8 V but upto 4.3 V.

The results are shown in Table 1.

TABLE 1

[Results of battery evaluation test]

| | Ether compound | Positive electrode binder | Half cell/ Full cell | Initial capacity (mAh/g) | Discharge capacity after 100 cycles (mAh/g) | Capacity maintenance ratio (%) |
|---|---|---|---|---|---|---|
| Ex. 1-1 | Compound 1-1 | Acrylic polymer 1-1 | Half cell | 103.2 | 98.20 | 95.16 |
| Ex. 1-2 | Compound 1-1 | Acrylic polymer 1-1 | Half cell | 104.0 | 99.20 | 95.38 |
| Ex. 1-3 | Compound 1-1 | Acrylic polymer 1-2 | Half cell | 103.5 | 98.58 | 95.25 |
| Ex. 1-4 | Compound 1-2 | Acrylic polymer 1-1 | Half cell | 105.1 | 101.8 | 96.86 |
| Ex. 1-5 | Compound 1-2 | Acrylic polymer 1-2 | Half cell | 104.9 | 100.0 | 95.33 |
| Ex. 1-6 | Compound 1-2 | Acrylic polymer 1-1 | Half cell | 104.7 | 100.0 | 95.51 |
| Ex. 1-7 | Compound 1-3 | Acrylic polymer 1-1 | Half cell | 103.5 | 98.80 | 95.46 |
| Ex. 1-8 | Compound 1-3 | Acrylic polymer 1-2 | Half cell | 103.0 | 97.99 | 95.14 |
| Ex. 1-9 | Compound 1-4 | Acrylic polymer 1-1 | Half cell | 103.8 | 99.29 | 95.66 |
| Ex. 1-10 | Compound 1-4 | Acrylic polymer 1-2 | Half cell | 103.3 | 98.39 | 95.25 |
| Comp. Ex. 1-1 | None | Acrylic polymer 1-1 | Half cell | 101.6 | 95.20 | 93.70 |
| Comp. Ex. 1-2 | Tetrahydrofuran | Acrylic polymer 1-1 | Half cell | 102.3 | 94.20 | 92.08 |
| Comp. Ex. 1-3 | 2-Methyl tetrahydrofuran | Acrylic polymer 1-1 | Half cell | 102.94 | 96.97 | 94.2 |
| Comp. Ex. 1-4 | 2-Methyl tetrahydrofuran | Acrylic polymer 1-2 | Half cell | 102.98 | 99.68 | 96.8 |
| Comp. Ex. 1-5 | 2-Methyl tetrahydrofuran | Acrylic polymer 1-1 | Half cell | 103.82 | 100.25 | 96.6 |

Example 1-11

Production of Binder Composition for Negative Electrode

In a 5 MPa pressure-resistant container equipped with a stirrer, 49 parts of 1,3-butadiene, 3.3 parts of methacrylic acid, 0.5 parts of acrylic acid, 46.7 parts of styrene, 0.27 parts of t-dodecyl mercaptan as a chain transfer agent, 2.52 parts of soft-type sodium decylbenzensulfonate as an emulsifier, 150 parts of ion exchanged water, and 0.5 parts of potassium persulfate as a polymerization initiator were placed and sufficiently stirred. Then, the mixture was warmed to 50° C. to initiate polymerization. When the polymerization conversion rate reached 96%, the resultant was cooled to stop the reaction, and thereby an aqueous dispersion liquid containing a binder was obtained.

To the aforementioned aqueous dispersion liquid containing a binder, a 5% sodium hydroxide aqueous solution was added for adjusting the pH to 8. The unreacted monomer was then removed by heat distillation under reduced pressure, and the residue was cooled to 30° C. or lower to obtain a binder composition for a negative electrode.

[Preparation of Carboxymethyl Cellulose Aqueous Solution]

As a CMC aqueous solution, an aqueous solution was prepared by adding water to carboxymethyl cellulose (trade name "MAC350HC", available from Nippon Paper Chemicals Co., Ltd.) so that the solid content concentration was adjusted to 1%.

[Production of Slurry for Formation of Electrode Active Material Layer for Negative Electrode]

In a planetary mixer, 100 parts of artificial graphite (mean particle diameter: 24.5 μm) having a specific surface area of 4 $m^2/g$ as a negative electrode active material and 0.64 parts (based on solid content) of the aforementioned CMC aqueous solution were placed. The solid content concentration was adjusted to 59% with water. Then mixing was performed at 25° C. for 60 minutes. Subsequently, 0.36 parts (based on solid content) of the CMC aqueous solution was added. The solid content concentration was adjusted to 47% with water, and mixing was further performed at 25° C. for 15 minutes to obtain a mixture solution.

To the mixture solution, 1 part (based on solid content) of the aforementioned aqueous dispersion liquid containing the binder and water were added to adjust the final solid content concentration to 45%, and the mixing was performed for additional 10 minutes. This mixture was subjected to a defoaming treatment under reduced pressure to obtain a slurry composition for a negative electrode having good fluidity.

[Production of Negative Electrode]

The aforementioned slurry composition for a negative electrode was applied to a copper foil having a thickness of 20 μm by a 50 μm doctor blade and dried at 50° C. for 20 minutes, and then further dried at 110° C. for 20 minutes. The electrode thus produced was subjected to roll press to obtain a negative electrode having an electrode active material layer having a thickness of 50 μm. The negative electrode thus produced was dried at 60° C. for 10 hours immediately before manufacture of a battery, and then used.

[Preparation of Carboxymethyl Cellulose Aqueous Solution]

As a CMC aqueous solution, an aqueous solution was prepared by adding water to carboxymethyl cellulose (trade name "BS-H", available from Dai-ichi Kogyo Seiyaku Co., Ltd.) so that the solid content concentration was adjusted to 2%.

[Production of Slurry Composition for Positive Electrode]

100 Parts of $LiMn_2O_4$ as a positive electrode active material and 5 parts of acetylene black as an electroconductivity imparting material were mixed using a planetary mixer. To the resulting mixture, the CMC aqueous solution (solid content concentration: 2%) in an amount of 0.8 parts in terms of CMC was added, and mixing was performed for 60 minutes. The mixture was diluted with 5.5 mL of water, and the binder composition 1-4 was added so that the amount in terms of solid content was 1.0 part, and mixing was performed for 45 minutes. The mixture was subjected to a defoaming treatment to produce a slurry composition for a positive electrode. The composition was glossy and excellent in fluidity.

[Production of Positive Electrode]

The aforementioned slurry composition for a positive electrode was applied to an aluminum foil having a thickness of 18 μm by a 75 μm doctor blade and dried at 50° C. for 20 minutes, and then further dried at 110° C. for 20 minutes. The electrode thus produced was subjected to roll press to obtain a positive electrode having an electrode active material layer having a thickness of 50 μm. The positive electrode thus produced was dried at 105° C. for 1.5 hours immediately before manufacture of a battery, and then used.

[Production of Coin Cells (Full Cell) for Evaluation]

The positive electrode obtained in the aforementioned procedure was cut in a disc shape having a diameter of 12 mm. As a counterelectrode thereof, the negative electrode obtained in the aforementioned procedure was cut in a disc shape having a diameter of 16 mm. A single layer polypropylene separator (porosity: 55%) having a thickness of 25 μm was produced by dry method. This was cut in a disc shape having a diameter of 19 mm, to prepare a separator.

The disc-shaped positive electrode, the disc-shaped separator, and the disc-shaped negative electrode were placed in a coin-type outer container made of stainless steel (diameter: 20 mm, height: 1.8 mm, and stainless steel thickness: 0.25 mm) equipped with a polypropylene packing. Upon placement, the disc-shaped positive electrode was disposed so that the aluminum foil of the positive electrode was in contact with the bottom surface of the outer container. The disc-shaped separator was disposed between the positive electrode and the negative electrode. The disc-shaped negative electrode was disposed so that the negative electrode active material layer is in contact with the separator. Thus, the electrode active material layer of the positive electrode was opposed to the electrode active material layer of the negative electrode via the separator. Then, a stainless steel plate having a thickness of 1.0 mm was placed on the lithium metal, and expanded metal was placed on the stainless steel plate. Subsequently, an electrolyte solution (available from Kishida Chemical Co., Ltd.) in which $LiPF_6$ was dissolved in a mixed solvent of ethylene carbonate and diethyl carbonate (ratio: ½ by volume) and vinylene carbonate (1.5% by volume) so that the concentration of $LiPF_6$ was 1 mol/L was poured into the container so that air did not remain therein, and a battery can was sealed to produce a coin cell (coin cell CR 2032) that was a lithium ion secondary battery having a diameter of 20 mm and a thickness of approximately 3.2 mm.

[Battery Evaluation Test: Evaluation of Cycle Property]

Each of 10 coin cell batteries was charged to 4.8 V by a constant current method at 0.2 C at 23° C., and then discharged at 0.2 C to 3.0 V. Subsequently, charging and dischargin were repeated under an atmosphere of 60° C. wherein charging was performed by a constant current method at 0.5 C to 4.3 V and discharging was performed at 1.0 C to 3.0 V, whereby the electrical capacity was measured. The mean value of 10 cells was taken as a measurement value. The capacity maintenance ratio represented by the ratio (%) of the discharge capacity after completion of 100 cycles and the discharge capacity after completion of 1 cycle under an atmosphere of 60° C. was calculated. High capacity maintenance ratio is considered to represent excellent high temperature cycle property.

The evaluation results are summarized in Table 2.

Example 1-12

A binder composition, a slurry composition for a positive electrode, a positive electrode, and coin cells were produced and evaluated in the same manner as in Example 1-11 except that the binder composition 1-5 was used in place of the binder composition 1-4 in the production of the slurry composition for the positive electrode.

The evaluation results are summarized in Table 2.

Comparative Example 1-6

A binder composition, a slurry composition for a positive electrode, a positive electrode, and coin cells were produced and evaluated in the same manner as in Example 1-11 except that the binder composition 1-6 was used in place of the binder composition 1-4 in the production of the slurry composition for the positive electrode.

The evaluation results are summarized in Table 2.

Comparative Example 1-7

A binder composition, a slurry composition for a positive electrode, a positive electrode, and coin cells were produced and evaluated in the same manner as in Example 1-11 except that the binder composition 1-8 was used in place of the binder composition 1-4 in the production of the slurry composition for the positive electrode.

The evaluation results are summarized in Table 2.

Comparative Example 1-8

A binder composition, a slurry composition for a positive electrode, a positive electrode, and coin cells were produced and evaluated in the same manner as in Example 1-11 except that the binder composition 1-9 was used in place of the binder composition 1-4 in the production of the slurry composition for the positive electrode.

The evaluation results are summarized in Table 2.

Example 1-13

The coin cells for evaluation obtained by the same procedure as in Example 1-11 were subjected to the battery evaluation test in the same manner as in Example 1-11 except that the charging of the cells by a constant current method at 0.2 C under an atmosphere of 23° C. in the battery evaluation test was not performed upto 4.8 V but upto 4.3 V.

The evaluation results are summarized in Table 2.

Comparative Example 1-9

The coin cells for evaluation obtained by the same procedure as in Comparative Example 1-7 were subjected to the battery evaluation test in the same manner as in Comparative Example 1-7 except that the charging of the cells by a constant current method at 0.2 C under an atmosphere of 23° C. in the battery evaluation test was not performed upto 4.8 V but upto 4.3 V.

The evaluation results are summarized in Table 2.

TABLE 2

[Results of battery evaluation test]

| | Ether compound | Positive electrode binder | Half cell/ Full cell | Initial capacity (mAh/g) | Discharge capacity after 100 cycles (mAh/g) | Capacity maintenance ratio (%) |
|---|---|---|---|---|---|---|
| Ex. 1-11 | Compound 1-2 | Acrylic polymer 1-1 | Full cell | 81.34 | 74.52 | 91.62 |
| Ex. 1-12 | Compound 1-2 | Acrylic polymer 1-2 | Full cell | 80.51 | 72.91 | 90.56 |
| Ex. 1-13 | Compound 1-2 | Acrylic polymer 1-1 | Full cell | 81.82 | 75.72 | 92.54 |
| Comp. Ex. 1-6 | None | Acrylic polymer 1-1 | Full cell | 76.13 | 64.43 | 84.63 |
| Comp. Ex. 1-7 | 2-Methyl tetra hydro furan | Acrylic polymer 1-1 | Full cell | 77.45 | 66.57 | 85.95 |
| Comp. Ex. 1-8 | 2-Methyl tetra hydro furan | Acrylic polymer 1-2 | Full cell | 77.35 | 67.81 | 87.67 |
| Comp. Ex. 1-9 | 2-Methyl tetra hydro furan | Acrylic polymer 1-1 | Full cell | 78.14 | 68.85 | 88.11 |

[Discussion]

From the results in Tables 1 and 2, it was found out that the batteries in which the electrode that was produced by using the binder composition containing the ether compound represented by the formula (1) was used are excellent in the initial discharge capacity at a temperature as high as 60° C. Examples resulted in excellent capacity maintenance ratio that was to the same extent as or higher than those in Comparative Examples, and also resulted in high discharge capacity after 100 cycles. Therefore, it was confirmed that a high discharge capacity can be achieved, and both a high discharge capacity and a stable charge-discharge cycle in a high temperature environment can be achieved.

Preparation of Ether Compound

Preparative Example 2-1

Preparation of Compound 2-1

(Tetrahydrofuran-2-yl)acetonitrile (available from Tokyo Chemical Industry Co., Ltd.) was dehydrated and purified by distillation under reduced pressure using a Kugelrohr apparatus in the presence of calcium hydride. Thus, the following compound 2-1 was prepared as an ether compound.

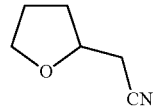

Compound 2-1

Preparative Example 2-2

Preparation of Compound 2-2

In a 4-necked reaction vessel equipped with a condenser, a thermometer and a dropping funnel, 25.5 g (0.64 mol) of sodium hydride having a content of 60% and 500 mL of tetrahydrofuran were placed under nitrogen gas stream. The mixture was cooled in an ice bath. 50 g (0.49 mol) of tetrahydrofurfuryl alcohol diluted with 200 mL of tetrahydrofuran was slowly added from the dropping funnel to the mixture in an ice bath. After then, reaction was performed at room temperature for 1 hour.

After completion of the reaction, 85.3 g (0.64 mol) of 3-bromopropionitrile diluted with 100 mL of tetrahydrofuran was slowly added from the dropping funnel to the mixture at room temperature. After then, reaction was performed at room temperature for 10 hours.

After completion of the reaction, about 200 mL of tetrahydrofuran was distilled off under reduced pressure by a rotary evaporator to reduce the amount of the reaction solution. Then, 2 L of water was added to the reaction solution, and the mixture was extracted twice with 500 mL of ethyl acetate. After the separation, the resulting ethyl acetate layer was dried by adding sodium sulfate, and the sodium sulfate was removed by filtration. Ethyl acetate was removed under reduced pressure by a rotary evaporator to give 15 g of pale yellow oil.

The pale yellow oil was purified by silica gel column chromatography (hexane:ethyl acetate=1:1) to give 8.8 g of pale yellow oil (yield: 11.6%). The resulting pale yellow oil was subjected to distillation under reduced pressure using a Kugelrohr apparatus in the presence of calcium hydride to give 3.8 g of colorless oil (yield: 5.0%). Thus, the following compound 2-2 was prepared as an ether compound.

The structure of the compound 2-2 thus produced was identified by $^1$H-NMR. The results are shown below.
$^1$H-NMR (400 MHz, CDCl$_3$, TMS, δ ppm): 4.13-4.02 (m, 1H), 3.90-3.85 (m, 1H), 3.79-3.68 (m, 3H), 3.57-3.46 (m, 2H), 2.62 (t, 2H, J=6.9 Hz), 2.00-1.83 (m, 3H), 1.67-1.58 (m, 1H).

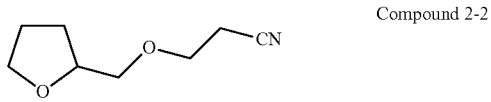 [SMILES: N#CCCOCC1CCCO1]

Compound 2-2

Preparative Example 2-3

Preparation of Compound 2-3

As an ether compound, the following compound 2-3 was prepared in the same manner as in the section [Preparation of compound 2-2] except that 3-bromopropionitrile was replaced with 4-bromobutyronitrile.

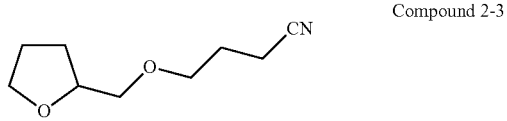 [SMILES: N#CCCCOCC1CCCO1]

Compound 2-3

Preparative Example 2-4

Preparation of Compound 2-4

As an ether compound, the following compound 2-4 was prepared in the same manner as in the section [Preparation of compound 2-2] except that 3-bromopropionitrile was replaced with 5-chlorovaleronitrile.

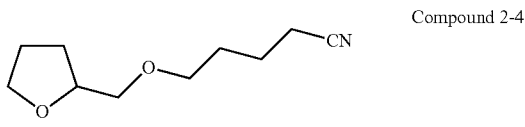 [SMILES: N#CCCCCOCC1CCCO1]

Compound 2-4

The structure of the compound 2-4 thus produced was identified by $^1$H-NMR. The results are shown below.
$^1$H-NMR (500 MHz, CDCl$_3$, TMS, δ ppm): 4.12-4.02 (m, 1H), 3.90-8.86 (m, 1H), 3.80-3.75 (m, 1H), 3.56-3.40 (m, 4H), 2.40 (t, 2H, J=6.5 Hz), 1.99-1.73 (m, 8H).

Example 2-1

Production of Binder (Acrylic-Based Polymer 2-1)

10.78 Parts of 2-ethylhexyl acrylate, 1.25 parts of acrylonitrile, 0.12 parts of sodium laurylsulfate, and 40.0 parts of ion exchanged water were placed in a polymerization tank A, and 0.2 parts of ammonium persulfate as a polymerization initiator and 10 parts of ion exchanged water were further added. The mixture was warmed to 60° C. and stirred for 90 minutes.

67.11 Parts of 2-ethylhexyl acrylate, 18.65 parts of acrylonitrile, 2.01 parts of methacrylic acid, 0.2 parts of allyl methacrylate, 0.7 parts of sodium laurylsulfate, and 88 parts of ion exchanged water were placed in another polymerization tank B, and stirred to prepare an emulsion.

The emulsion prepared in the polymerization tank B was sequentially added to the polymerization tank A over about 180 minutes, and the mixture was stirred for about 120 minutes. When the amount of monomer consumption reached 95%, the mixture was cooled to complete the reaction. A dispersion liquid 2-1 in which particles of acrylic-based polymer 2-1 were dispersed in water was thereby obtained. The polymerization conversion rate measured from the solid content concentration was 92.6%. The solid content concentration of the resulting dispersion liquid 2-1 was 36.7%. The glass transition temperature Tg of the acrylic-based polymer 2-1 was −35.4° C.

[Preparation of Carboxymethyl Cellulose Aqueous Solution]

As a CMC aqueous solution, an aqueous solution was prepared by adding water to carboxymethyl cellulose (trade name "BS-H", available from Dai-ichi Kogyo Seiyaku Co., Ltd.) so that the solid content concentration was adjusted to 2%.

[Production of Slurry for Formation of Electrode Active Material Layer for Positive Electrode]

100 Parts of LiMn$_2$O$_4$ as a positive electrode active material and 5 parts of acetylene black as an electroconductivity imparting material were mixed using a planetary mixer. To the resulting mixture, the CMC aqueous solution (solid content concentration: 2%) in an amount of 0.8 parts in terms of CMC was added, and mixing was performed for 60 minutes. Water was further added to dilute the CMC aqueous solution to a concentration of 69.5%, and the aqueous dispersion liquid 2-1 of particles of acrylic-based polymer (solid content concentration: 36.7%) was added so that the amount of the binder was 1.0 part. Then mixing was performed for 10 minutes. The mixture was subjected to a defoaming treatment to obtain a slurry 2-1 for formation of an electrode active material layer for a positive electrode. The composition was glossy and excellent in fluidity.

[Production of Positive Electrode]

The slurry 2-1 for formation of an electrode active material layer for a positive electrode was applied to an aluminum foil having a thickness of 18 μm by a 75 μm doctor blade and dried at 50° C. for 20 minutes, and then further dried at 110° C. for 20 minutes. The electrode thus produced was subjected to roll press to obtain a positive electrode having an electrode active material layer having a thickness of 50 μm. The positive electrode thus produced was dried at 105° C. for 3 hours immediately before manufacture of a battery, and then used.

[Production of Electrolyte Solution Composition]

An electrolyte solution (available from Kishida Chemical Co., Ltd.) in which $LiPF_6$ was dissolved in a mixed solvent of ethylene carbonate and diethyl carbonate (ratio: ½ by volume) so that the concentration of $LiPF_6$ was 1 mol/L was prepared. In a glove box, 0.15 mL of the compound 2-1 synthesized in Preparative Example 2-1 was added to 10 mL of the electrolyte solution, and the mixture was stirred. The electrolyte solution composition thus obtained was used as an electrolyte solution for performing the battery evaluation test which will be described later.

[Production of Coin Cell Batteries (Half Cell) for Evaluation]

The positive electrode obtained in the aforementioned procedure was cut in a disc shape having a diameter of 12 mm. As a counterelectrode thereof, lithium metal was cut in a disc shape having a diameter of 14 mm. A single layer polypropylene separator (porosity: 55%) having a thickness of 25 μm was produced by dry method. This was cut in a disc shape having a diameter of 19 mm, to prepare a separator.

The disc-shaped positive electrode, the disc-shaped separator, and the disc-shaped lithium metal were placed in a coin-type outer container made of stainless steel (diameter: 20 mm, height: 1.8 mm, and stainless steel thickness: 0.25 mm) equipped with a polypropylene packing. Upon placement, the disc-shaped positive electrode was disposed so that the aluminum foil of the positive electrode was in contact with the bottom surface of the outer container. The disc-shaped separator was disposed between the positive electrode and the negative electrode. The disc-shaped lithium metal, i.e. the negative electrode, was disposed on the separator. Thus, the electrode active material layer of the positive electrode was opposed to the lithium metal via the separator. Then, a stainless steel plate having a thickness of 0.5 mm was placed on the lithium metal, and expanded metal was placed on the stainless steel plate. Subsequently, the aforementioned electrolyte solution composition was poured into the container so that air did not remain therein, and a battery can was sealed to produce a coin cell (coin cell CR 2032) that was a lithium secondary battery having a diameter of 20 mm and a thickness of about 3.2 mm.

[Battery Evaluation Test: Evaluation of Cycle Property]

Each of 10 coin cell battery was charged to 4.8 V by a constant current method at 0.2 C at 23° C., and then discharged at 0.2 C to 3.0 V. Subsequently, charging and discharging were repeated under an atmosphere of 60° C. wherein charging was performed by a constant current method at 0.5 C to 4.3 V and discharging was performed at 1.0 C to 3.0 V, whereby the electrical capacity was measured. The mean value of 10 cells was taken as a measurement value. The capacity maintenance ratio represented by a ratio (%) of the discharge capacity after completion of 100 cycles and the discharge capacity after completion of 1 cycle under an atmosphere of 60° C. was calculated. High capacity maintenance ratio is considered to represent excellent high temperature cycle property.

The evaluation results are summarized in Table 3.

Example 2-2

A positive electrode, an electrolyte solution composition, and coin cells were produced and evaluated in the same manner as in Example 2-1 except that the compound 2-2 synthesized in Preparative Example 2-2 was used in place of the compound 2-1 synthesized in Preparative Example 2-1 in the production of the electrolyte solution composition. The results of the evaluation are shown in Table 3.

Example 2-3

A positive electrode, an electrolyte solution composition, and coin cells were produced and evaluated in the same manner as in Example 2-1 except that the compound 2-3 synthesized in Preparative Example 2-3 was used in place of the compound 2-1 synthesized in Preparative Example 2-1 in the production of the electrolyte solution composition. The results of the evaluation are shown in Table 3.

Example 2-4

A positive electrode, an electrolyte solution composition, and coin cells were produced and evaluated in the same manner as in Example 2-1 except that the compound 2-4 synthesized in Preparative Example 2-4 was used in place of the compound 2-1 synthesized in Preparative Example 2-1 in the production of the electrolyte solution composition. The results of the evaluation are shown in Table 3.

Example 2-5

Production of Binder (Acrylic-Based Polymer 2-2)

2.0 Parts of itaconic acid, 0.1 parts of sodium alkyl diphenyl ether disulfonate (Dow fax 2A1 available from The Dow Chemical Company), and 76.0 parts of ion exchanged water were placed in a polymerization tank A, and 0.6 parts of potassium persulfate as a polymerization initiator and 10 parts of ion exchanged water were further added. The mixture was warmed to 80° C. and stirred for 90 minutes.

76 Parts of 2-ethylhexyl acrylate, 20 parts of acrylonitrile, 2.0 parts of itaconic acid, 0.6 parts of sodium alkyl diphenyl ether disulfonate, and 60 parts of ion exchanged water were placed in another polymerization tank B, and stirred to prepare an emulsion.

The emulsion prepared in the polymerization tank B was sequentially added to the polymerization tank A over about 180 minutes, and the mixture was stirred for about 120 minutes. After the amount of monomer consumption reached 95%, 0.2 parts of ammonium persulfate and 5 parts of ion exchanged water were added to the mixture, and the mixture was warmed to 90° C., and stirred for 120 minutes, and cooled to complete the reaction. A dispersion liquid 2-2 in which particles of acrylic-based polymer 2-2 were dispersed in water was obtained. The polymerization conversion rate measured from the solid content concentration was 92.3%. The solid content concentration of the resulting dispersion liquid 2-2 was 38.3%. The glass transition temperature Tg of the acrylic-based polymer 2-2 was −37.0° C.

[Preparation of Carboxymethyl Cellulose Aqueous Solution]

As a CMC aqueous solution, an aqueous solution was prepared by adding water to carboxymethyl cellulose (trade name "BS-H", available from Dai-ichi Kogyo Seiyaku Co., Ltd.) so that the solid content concentration was adjusted to 2%.

[Production of Slurry for Formation of Electrode Active Material Layer for Positive Electrode]

100 Parts of $LiMn_2O_4$ as a positive electrode active material and 5 parts of acetylene black as an electroconductivity imparting material were mixed using a planetary mixer. To the resulting mixture, the CMC aqueous solution (solid content concentration: 2%) in an amount of 0.8 parts in terms of CMC was added, and mixing was performed for 60 minutes. Water was further added to dilute the CMC aqueous solution to a concentration of 69.5%, and the aqueous dispersion liquid 2-2 of particles of the aforementioned acrylic-based polymer (solid content concentration: 38.3%) was further added so that the amount of the binder was 1.0 part. Then mixing was performed for 10 minutes. The mixture was subjected to a defoaming treatment to produce a slurry 2-2 for formation of an electrode active material layer for a positive electrode. The composition was glossy and excellent in fluidity.

A positive electrode, an electrolyte solution composition, and coin cells were produced and evaluated in the same manner as in Example 2-1 except that, in the production of the positive electrode, the aforementioned slurry 2-2 for formation of the electrode active material layer for the positive electrode was used in place of the slurry 2-1 for formation of the electrode active material layer for the positive electrode. The results of the evaluation are shown in Table 3.

Example 2-6

A positive electrode, an electrolyte solution composition, and coin cells were produced and evaluated in the same manner as in Example 2-4 except that, in the production of the positive electrode, the aforementioned slurry 2-2 for formation of the electrode active material layer for the positive electrode was used in place of the slurry 2-1 for formation of the electrode active material layer for the positive electrode. The results of the evaluation are shown in Table 3.

Comparative Example 2-1

A positive electrode, an electrolyte solution composition, and coin cells were produced and evaluated in the same manner as in Example 2-1 except that the compound 2-1 synthesized in Preparative Example 2-1 was not added in the production of the electrolyte solution composition. The results of the evaluation are shown in Table 3.

Comparative Example 2-2

A positive electrode, an electrolyte solution composition, and coin cells were produced and evaluated in the same manner as in Example 2-1 except that tetrahydrofuran was used in place of the compound 2-1 synthesized in Preparative Example 2-1 in the production of the electrolyte solution composition. The results of the evaluation are shown in Table 3.

Comparative Example 2-3

A positive electrode, an electrolyte solution composition, and coin cells were produced and evaluated in the same manner as in Example 2-1 except that 2-methyltetrahydrofuran was used in place of the compound 2-1 synthesized in Preparative Example 2-1 in the production of the electrolyte solution composition. The results of the evaluation are shown in Table 3.

TABLE 3

| | Ether compound | Positive electrode binder | Half cell/ Full cell | Initial capacity (mAh/g) | Discharge capacity after 100 cycles (mAh/g) | Capacity maintenance ratio (%) |
| --- | --- | --- | --- | --- | --- | --- |
| Ex. 2-1 | Compound 2-1 | Acrylic polymer 2-1 | Half cell | 103.19 | 100.30 | 97.2 |
| Ex. 2-2 | Compound 2-2 | Acrylic polymer 2-1 | Half cell | 103.04 | 99.81 | 96.9 |
| Ex. 2-3 | Compound 2-3 | Acrylic polymer 2-1 | Half cell | 103.56 | 100.25 | 96.8 |
| Ex. 2-4 | Compound 2-4 | Acrylic polymer 2-1 | Half cell | 103.85 | 100.65 | 96.9 |
| Ex. 2-5 | Compound 2-1 | Acrylic polymer 2-2 | Half cell | 102.98 | 99.68 | 96.8 |
| Ex. 2-6 | Compound 2-4 | Acrylic polymer 2-2 | Half cell | 103.82 | 100.25 | 96.6 |
| Comp. Ex. 2-1 | None | Acrylic polymer 2-1 | Half cell | 102.22 | 96.30 | 94.2 |
| Comp. Ex. 2-2 | Tetra hydro furan | Acrylic polymer 2-1 | Half cell | 103.31 | 96.40 | 93.3 |
| Comp. Ex. 2-3 | 2-Methyl tetra hydro furan | Acrylic polymer 2-1 | Half cell | 102.94 | 96.97 | 94.2 |

Example 2-7

Production of Negative Electrode

A negative electrode was produced in the same manner as in Example 1-11.

[Production of Electrolyte Solution Composition]

An electrolyte solution (available from Kishida Chemical Co., Ltd.) in which $LiPF_6$ was dissolved in a mixed solvent of ethylene carbonate and diethyl carbonate (ratio: ½ by volume) and vinylene carbonate (1.5% by volume) so that the concentration of $LiPF_6$ was 1 mol/L was prepared. In a glove box, 0.15 mL of the compound 2-1 synthesized in Preparative Example 2-1 was added to 10 mL of the electrolyte solution, and the mixture was stirred. The electrolyte solution composition thus obtained was used as an electrolyte solution for performing the battery evaluation test which will be described later.

[Production of Coin Cells (Full Cell) for Evaluation]

The positive electrode produced in Example 2-1 was cut in a disc shape having a diameter of 12 mm. As a counterelectrode thereof, the negative electrode obtained in the aforementioned procedure was cut in a disc shape having a diameter of 16 mm. A single layer polypropylene separator (porosity: 55%) having a thickness of 25 μm was produced by dry method. This was cut in a disc shape having a diameter of 19 mm, to prepare a separator.

The disc-shaped positive electrode, the disc-shaped separator, and the disc-shaped negative electrode were placed in a coin-type outer container made of stainless steel (diameter: 20 mm, height: 1.8 mm, and stainless steel thickness: 0.25 mm) equipped with a polypropylene packing. Upon placement, the disc-shaped positive electrode was disposed so that the aluminum foil of the positive electrode was in contact with the bottom surface of the outer container. The disc-shaped separator was disposed between the positive electrode and the negative electrode. The disc-shaped negative electrode was disposed so that the negative electrode active material layer was in contact with the separator. Thus, the electrode active material layer of the positive electrode was opposed to the electrode active material layer of the negative electrode via the separator. Then, a stainless steel plate having a thickness of 1.0 mm was placed on the lithium metal, and expanded metal was placed on the stainless steel plate. Subsequently, the electrolyte solution previously prepared was poured into the container so that air did not remain therein, and a battery can was sealed to produce a coin cell (coin cell CR 2032) that was a lithium ion secondary battery having a diameter of 20 mm and a thickness of about 3.2 mm.

[Battery Evaluation Test: Evaluation of Cycle Property]

Each of 10 coin cell batteries was charged to 4.8 V by a constant current method at 0.2 C at 23° C., and then discharged at 0.2 C to 3.0 V. Subsequently, charging and discharging were repeated under an atmosphere of 60° C. wherein charging was performed by a constant current method at 0.5 C to 4.3 V and discharging was performed at 1.0 C to 3.0 V, whereby the electrical capacity was measured. The mean value of 10 cells was taken as a measurement value. The capacity maintenance ratio represented by a ratio (%) of the discharge capacity after completion of 100 cycles and the discharge capacity after completion of 1 cycle under an atmosphere of 60° C. was calculated. High capacity maintenance ratio is considered to represent excellent high temperature cycle property.

The evaluation results are summarized in Table 4.

Example 2-8

A negative electrode, a positive electrode, an electrolyte solution composition, and coin cells were produced and evaluated in the same manner as in Example 2-7 except that the compound 2-4 synthesized in Preparative Example 2-4 was used in place of the compound 2-1 synthesized in Preparative Example 2-1 in the production of the electrolyte solution composition. The results of the evaluation are shown in Table 4.

Example 2-9

A positive electrode, a negative electrode, an electrolyte solution composition, and coin cells were produced and evaluated in the same manner as in Example 2-7 except that, in the production of the positive electrode, the aforementioned slurry 2-2 for formation of the electrode active material layer for the positive electrode was used in place of the slurry 2-1 for formation of the electrode active material layer for the positive electrode. The results of the evaluation are shown in Table 4.

Example 2-10

A negative electrode, a positive electrode, an electrolyte solution composition, and coin cells were produced and evaluated in the same manner as in Example 2-9 except that the compound 2-4 synthesized in Preparative Example 2-4 was used in place of the compound 2-1 synthesized in Preparative Example 2-1 in the production of the electrolyte solution composition. The results of the evaluation are shown in Table 4.

Comparative Example 2-4

A positive electrode, a negative electrode, an electrolyte solution composition, and coin cells were produced and evaluated in the same manner as in Example 2-7 except that the compound 2-1 synthesized in Preparative Example 2-1 was not added in the production of the electrolyte solution composition. The results of the evaluation are shown in Table 4.

Comparative Example 2-5

A positive electrode, an electrolyte solution composition, and coin cells were produced and evaluated in the same manner as in Example 2-7 except that tetrahydrofuran was used in place of the compound 2-1 synthesized in Preparative Example 2-1 in the production of the electrolyte solution composition. The results of the evaluation are shown in Table 4.

Comparative Example 2-6

A positive electrode, an electrolyte solution composition, and coin cells were produced and evaluated in the same manner as in Example 2-7 except that 2-methyltetrahydrofuran was used in place of the compound 2-1 synthesized in Preparative Example 2-1 in the production of the electrolyte solution composition. The results of the evaluation are shown in Table 4.

TABLE 4

| | Ether compound | Positive electrode binder | Half cell/ Full cell | Initial capacity (mAh/g) | Discharge capacity after 100 cycles (mAh/g) | Capacity maintenance ratio (%) |
|---|---|---|---|---|---|---|
| Ex. 2-7 | Compound 2-1 | Acrylic polymer 2-1 | Full cell | 80.25 | 72.48 | 90.3 |
| Ex. 2-8 | Compound 2-4 | Acrylic polymer 2-1 | Full cell | 81.05 | 74.52 | 91.9 |
| Ex. 2-9 | Compound 2-1 | Acrylic polymer 2-2 | Full cell | 79.89 | 71.95 | 90.1 |
| Ex. 2-10 | Compound 2-4 | Acrylic polymer 2-2 | Full cell | 80.00 | 72.55 | 90.7 |
| Comp. Ex. 2-4 | None | Acrylic polymer 2-1 | Full cell | 77.08 | 66.83 | 86.7 |
| Comp. Ex. 2-5 | Tetra hydro furan | Acrylic polymer 2-1 | Full cell | 77.85 | 68.20 | 87.6 |
| Comp. Ex. 2-6 | 2-Methyl tetra hydro furan | Acrylic polymer 2-1 | Full cell | 78.51 | 68.55 | 87.3 |

From the results in Tables 3 and 4, it was found out that the batteries in which the electrolyte solution composition containing the ether compound represented by the formula (1) was used have a high capacity maintenance ratio at a temperature as high as 60° C. and excellent cycle property.

Examples 2-1 to 2-6 resulted in excellent initial capacity that was to the same extent as or higher than those in Comparative Examples 2-1 to 2-3, and also resulted in high discharge capacity after 100 cycles. Therefore, it was confirmed that a high discharge capacity can be achieved, and both a high discharge capacity and a stable charge-discharge cycle in a high temperature environment can be achieved. Examples 2-7 to 2-10 resulted in excellent initial capacity that was to the same extent as or higher than those in Comparative Examples 2-4 to 2-6, and also resulted in high discharge capacity after 100 cycles. Therefore, it was confirmed that a high discharge capacity can be achieved, and both a high discharge capacity and a stable charge-discharge cycle in a high temperature environment can be achieved.

INDUSTRIAL APPLICABILITY

The binder composition and electrolyte solution composition of the present invention can be applied to a secondary battery such as a lithium secondary battery. Further, the non-aqueous battery of the present invention can be used as power sources for electrical apparatuses such as cell phones or notebook computers or vehicles such as electric automobile.

The invention claimed is:

1. A binder composition for a non-aqueous battery electrode, comprising a binder and an ether compound represented by formula (1):

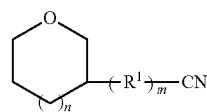
(1)

wherein
n represents 0 or 1,
m represents 1, and
$R^1$ is represented by formula (2):

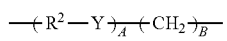
(2)

wherein
A represents 1,
Y represents —O—,
$R^2$ represents a divalent linear hydrocarbon group of 1 to 16 carbon atoms, and
B represents and integer of 0 to 11.

2. The binder composition for a non-aqueous battery electrode according to claim 1, wherein the ether compound is represented by formula (3):

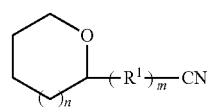
(3)

wherein
n represents 0 or 1,
m represents 1, and
$R^1$ represents a divalent linear hydrocarbon group which has in the bond thereof an intervening group —O—.

3. The binder composition for a non-aqueous battery electrode according to claim 1, wherein the binder contains an acrylic-based polymer.

4. A slurry composition for a non-aqueous battery electrode, comprising an electrode active material and the binder composition for a non-aqueous battery electrode according to claim 1.

5. An electrode for a non-aqueous battery, comprising a current collector and an electrode active material layer provided on a surface of the current collector, where
in the electrode active material layer is obtained by applying and drying the slurry composition for a non-aqueous battery electrode according to claim 4.

6. A slurry composition for a positive electrode of a non-aqueous battery, comprising a positive electrode active material and the binder composition for a non-aqueous battery electrode according to claim 3.

7. A positive electrode for a non-aqueous battery, comprising a current collector and a positive electrode active material layer provided on a surface of the current collector, wherein
the positive electrode active material layer is obtained by applying and drying the slurry composition for a positive electrode of a non-aqueous battery according to claim 6.

8. A non-aqueous battery comprising a positive electrode, a negative electrode, and a non-aqueous electrolyte solution, wherein
at least one of the positive electrode and the negative electrode is the electrode for a non-aqueous battery according to claim 5.

9. An electrolyte solution composition for a non-aqueous battery, comprising an organic solvent, an electrolyte dissolved in the organic solvent, and an ether compound represented by formula (1):

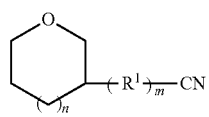
(1)

wherein
n represents 0 or 1,
m represents 1, and
$R^1$ in the formula (1) is represented by formula (2):

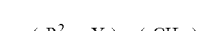
(2)

wherein
A represents 1,
Y represents —O—,
$R^2$ represents a divalent linear hydrocarbon group of 1 to 16 carbon atoms, and
B represents an integer of 0 to 11.

10. The electrolyte solution composition for a non-aqueous battery according to claim 9, wherein the ether compound is represented by formula (3):

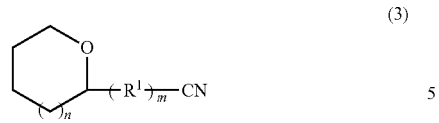

(3)

wherein
n represents 0 or 1,
m represents 1, and
R1 represents a divalent linear hydrocarbon group which has may have in the bond thereof an intervening group -O-.

11. A non-aqueous battery comprising the electrolyte solution composition for a non-aqueous battery of claim 9.

12. The non-aqueous battery according to claim 11, further comprising a positive electrode and a negative electrode, wherein at least one of the positive electrode and the negative electrode is an electrode for a non-aqueous battery including a current collector and an electrode active material layer provided on a surface of the current collector, the electrode active material layer being obtained by applying and drying a slurry composition for a non-aqueous battery electrode, the slurry composition for a non-aqueous battery electrode containing an electrode active material and a binder composition for a non-aqueous battery electrode, and the binder composition for a non-aqueous battery electrode containing a binder and an ether compound represented by the formula (1).

* * * * *